(12) United States Patent
Katagiri et al.

(10) Patent No.: US 8,249,108 B2
(45) Date of Patent: Aug. 21, 2012

(54) FRAME GENERATING METHOD

(75) Inventors: Toru Katagiri, Kawasaki (JP); Osamu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 12/461,002

(22) Filed: Jul. 29, 2009

(65) Prior Publication Data

US 2010/0067547 A1 Mar. 18, 2010

(51) Int. Cl.
*H04J 3/02* (2006.01)
*H04J 3/24* (2006.01)

(52) U.S. Cl. ........................................ 370/474; 370/537

(58) Field of Classification Search ......................... None
See application file for complete search history.

(56) References Cited

U.S. PATENT DOCUMENTS

| | | | | |
|---|---|---|---|---|
| 2002/0131408 A1* | 9/2002 | Hsu et al. | ...................... | 370/355 |
| 2004/0042462 A1* | 3/2004 | O'Neill et al. | ............. | 370/395.5 |
| 2004/0213282 A1* | 10/2004 | Kirk et al. | ...................... | 370/458 |
| 2006/0104309 A1* | 5/2006 | Vissers et al. | .................. | 370/474 |
| 2007/0076767 A1* | 4/2007 | Loprieno et al. | .............. | 370/539 |
| 2008/0165691 A1* | 7/2008 | Jorgenson et al. | ............. | 370/235 |
| 2008/0279553 A1* | 11/2008 | Meagher et al. | ................. | 398/58 |
| 2009/0323727 A1* | 12/2009 | Surek | ............................. | 370/503 |
| 2010/0080245 A1* | 4/2010 | Kisaka et al. | .................. | 370/470 |

FOREIGN PATENT DOCUMENTS

JP  2008-113394  5/2008
JP  2008-113395  5/2008

* cited by examiner

*Primary Examiner* — Chi Pham
*Assistant Examiner* — Soon-Dong Hyun
(74) *Attorney, Agent, or Firm* — Staas & Halsey LLP

(57) ABSTRACT

A frame generating device includes an inserting portion and an accommodating portion. The inserting portion inserts a first fixed stuff byte and a second fixed stuff byte into a payload area of an OTU frame, the first fixed stuff byte being of $(8+10n)$ ("n" is zero or a given positive integer)$\times 4$ rows, the second fixed stuff byte being of a given byte$\times 4$ rows, the given byte being equal to zero or more and being equal to $(24-10n)$ or more. The accommodating portion accommodates Ethernet signal in the payload area other than the first fixed stuff byte and the second fixed stuff byte.

15 Claims, 29 Drawing Sheets

FIG. 3

| No. | ODU4 Client | Client bitrate [Gbps] | MULTIPLEXING NUMBER TO ODU4 | BIT RATE [Gbps] |
|---|---|---|---|---|
| 1 | 100GbE | 103.1250 | 1 | 103.1250 |
| 2 | ODU3 | 40.3192 | 2 | 80.6384 |
| 3 | ODU2e | 10.3995 | 10 | 103.9952 |
| 4 | ODU2 | 10.0373 | 10 | 100.3727 |
| 5 | ODU1 | 2.4988 | 40 | 99.9510 |
| 6 | ODU0 | 1.2494 | 80 | 99.9528 |

| JC bits 678 | NJO2 | NJO1 | PJO1 | PJO2 |
|---|---|---|---|---|
| 000 | Justification byte | Justification byte | Data byte | Data byte |
| 001 | Justification byte | Data byte | Data byte | Data byte |
| 010 | Justification byte | Justification byte | Justification byte | Justification byte |
| 011 | Justification byte | Justification byte | Justification byte | Data byte |
| 100 | | | Not generated | |
| 101 | Data byte | Data byte | Data byte | Data byte |
| 110 | | | Not generated | |
| 111 | | | Not generated | |

| No. | ODU4 Client | Client bit-rate[Gbps] | MULTIPLEXING NUMBER TO ODU4 | NUMBER OF TRIBUTARY SLOT |
|---|---|---|---|---|
| 1 | 100GbE | 103.1250 | 1 | CBR mapping |
| 2 | ODU3 | 40.3192 | 2 | 16 |
| 3 | ODU2e | 10.3995 | 10 | 4 |
| 4 | ODU2 | 10.0373 | 10 | 4 |
| 5 | ODU1 | 2.4988 | 40 | 1 |

FIG. 16

| JC bits 6 7 8 | NJO2 | NJO1 | PJ01 | PJ02 | PJ03 |
|---|---|---|---|---|---|
| 0 0 0 | Justification byte | Justification byte | Data byte | Data byte | Data byte |
| 0 0 1 | Justification byte | Data byte | Data byte | Data byte | Data byte |
| 0 1 0 | Justification byte | Justification byte | Justification byte | Justification byte | Data byte |
| 0 1 1 | Justification byte | Justification byte | Justification byte | Data byte | Data byte |
| 1 0 0 | | | Not generated | | |
| 1 0 1 | Data byte | Data byte | Data byte | Data byte | Data byte |
| 1 1 0 | Justification byte | Justification byte | Justification byte | Justification byte | Justification byte |
| 1 1 1 | | | Not generated | | |

FIG. 17

| ODU4 Client | bitrate (Gbps) | FREQUENCY FLUCTUATION (ppm) | JC(byte/frame) | | | MAXIMUM NUMBER OF MULTIPLEXING TO ODU4 |
|---|---|---|---|---|---|---|
| | | | (min) | (typ) | (max) | |
| 100GbE | 103.1250 | ±100ppm | −1.8086 | 0.0000 | +1.8087 | 1 |
| ODU3 | 40.3192 | ±20ppm | +1.0562 | +1.5276 | +1.9991 | 2 |
| ODU2e | 10.3995 | ±100ppm | −2.6340 | −0.8101 | +1.0138 | 10 |
| ODU2 | 10.0373 | ±20ppm | −2.8372 | −2.2504 | −1.6636 | 10 |
| ODU1 | 2.4988 | ±20ppm | −0.4723 | +0.1120 | +0.6963 | 40 |

FIG. 19

| | ROW 1 | ROW 2 | ROW 3 | ROW 4 | ROW 1 | ROW 2 | ROW 3 | ROW 4 |
|---|---|---|---|---|---|---|---|---|
| 1 | | | | | | | | |
| ... | | | | | | | | |
| 15 | | | PS | | | | PS | |
| 16 | TS1JOH1 | | | | TS2JOH1 | | | |
| 17 | TS1JOH2 | | | | TS2JOH2 | | | |
| 18 | FS | | | | FS | | | |
| 19 | FS | | | | FS | | | |
| 20 | FS | | | | FS | | | |
| 21 | TS #1 | | | | TS #41 | | | |
| 22 | TS #2 | | | | TS #42 | | | |
| 23 | TS #3 | | | | TS #43 | | | |
| ... | | | | | | | | |
| 98 | TS #38 | | | | TS #78 | | | |
| 99 | TS #39 | | | | TS #79 | | | |
| 100 | TS #40 | | | | TS #80 | | | |
| 101 | TS #1 | | | | TS #41 | | | |
| 102 | TS #2 | | | | TS #42 | | | |
| 103 | TS #3 | | | | TS #43 | | | |
| ... | | | | | | | | |
| 3778 | TS #38 | | | | TS #78 | | | |
| 3779 | TS #39 | | | | TS #79 | | | |
| 3780 | TS #40 | | | | TS #80 | | | |
| 3781 | TS #1 | | | | TS #41 | | | |
| 3782 | TS #2 | | | | TS #42 | | | |
| 3783 | TS #3 | | | | TS #43 | | | |
| ... | | | | | | | | |
| 3818 | TS #38 | | | | TS #78 | | | |
| 3819 | TS #39 | | | | TS #79 | | | |
| 3820 | TS #40 | | | | TS #80 | | | |
| 3821 | FS | | | | FS | | | |
| 3822 | FS | | | | FS | | | |
| 3823 | FS | | | | FS | | | |
| 3824 | FS | | | | FS | | | |

FIG. 26

| No. | ODU4 Client | Client bit-rate[Gbps] | MULTIPLEXING NUMBER TO ODU4 | NUMBER OF TRIBUTARY SLOT |
|---|---|---|---|---|
| 1 | 100GbE | 103.1250 | 1 | CBR mapping |
| 2 | ODU3 | 40.3792 | 2 | 32 |
| 3 | ODU2e | 10.3995 | 10 | 8 |
| 4 | ODU2 | 10.0373 | 10 | 8 |
| 5 | ODU1 | 2.4988 | 40 | 2 |
| 6 | ODU0 | 1.2494 | 80 | 1 |

FIG. 28

| JC bits 678 | NJO2 | NJO1 | PJO1 | PJO2 | PJO3 |
|---|---|---|---|---|---|
| 000 | Justification byte | Justification byte | Date byte | Date byte | Date byte |
| 001 | Justification byte | Date byte | Date byte | Date byte | Date byte |
| 010 | Justification byte | Justification byte | Justification byte | Date byte | Date byte |
| 011 | Justification byte | Justification byte | Justification byte | Date byte | Date byte |
| 100 | Not generated | | | | |
| 101 | Date byte | Date byte | Date byte | Date byte | Date byte |
| 110 | Justification byte | Justification byte | Justification byte | Justification byte | Justification byte |
| 111 | Not generated | | | | |

FIG. 29

| ODU4 Client | bitrate (Gbps) | FREQUENCY FLUCTUATION (ppm) | JC(byte/frame) | | | MAXIMUM NUMBER OF MULTIPLEXING TO ODU4 |
|---|---|---|---|---|---|---|
| | | | (min) | (typ) | (max) | |
| 100GbE | 103.1250 | ±100ppm | -1.8086 | 0.0000 | +1.8087 | 1 |
| ODU3 | 40.3192 | ±20ppm | +1.0562 | +1.5276 | +1.9991 | 2 |
| ODU2e | 10.3995 | ±100ppm | -2.6340 | -0.8101 | +1.0138 | 10 |
| ODU2 | 10.0373 | ±20ppm | -2.8372 | -2.2504 | -1.6636 | 10 |
| ODU1 | 2.4988 | ±20ppm | -0.4723 | +0.1120 | +0.6963 | 40 |
| ODU0 | 1.2494 | ±20ppm | -0.2144 | +0.3699 | +0.9542 | 80 |

FRAME GENERATING METHOD

CROSS-REFERENCE TO RELATED APPLICATION

This application is based upon and claims the benefit of priority of the prior Japanese Patent Application No. 2008-224104, filed on Sep. 1, 2008, the entire contents of which are incorporated herein by reference.

FIELD

The present invention relates to a frame generating device.

BACKGROUND

An OTN (Optical Transport Network) is standardized as a framework in an optical network field adopting a WDM (Wavelength Division Multiplexing) technology. The OTN is capable of accommodating a plurality of client signal types and is capable of transmitting a large amount of client signals. Japanese Patent Application Publication No. 2008-113395 discloses an optical transmission system accommodating and multiplexing client signal in an OTU (Optical Transfer Unit) frame of an OTN and transmitting the accommodated and multiplexed client signal.

Recently, standardization of Ethernet having a bit rate of approximately 100 Gbps is being reviewed as a next generation Ethernet with respect to the Ethernet that is one of main client signals. An OTN requires a frame accommodating and transmitting 100 Gbps bit rate Ethernet signal. The OTN requires a frame multiplexing, accommodating and transmitting a plurality of signal types having a bit rate lower than 100 Gbps.

SUMMARY

According to an aspect of the present invention, there is provided a frame generating device including an inserting portion and an accommodating portion. The inserting portion inserts a first fixed stuff byte and a second fixed stuff byte into a payload area of an OTU frame, the first fixed stuff byte being of (8+10n ("n" is zero or a given positive integer))×4 rows, the second fixed stuff byte being of a given byte×4 rows, the given byte being equal to zero or more and being equal to (24−10n) or more. The accommodating portion accommodates Ethernet signal in the payload area other than the first fixed stuff byte and the second fixed stuff byte.

According to another aspect of the present invention, there is provided a frame generating device including an inserting portion and an accommodating portion. The inserting portion inserts a first fixed stuff byte into a payload area of an OPU frame of each of 40 OTU frames, the first fixed stuff byte being of (8+40n ("n" is zero or a given positive integer))×4 rows. The accommodating portion accommodates (95−n) tributary slot groups including 40 tributary slots in a payload area other than the first fixed stuff byte of each of the 40 OPU frames and treats the 40 OTU frames as a single multi frame period when accommodating a plurality of signal types in the OTU frame, a unit of the tributary slot being 1 byte×4 rows.

According to another aspect of the present invention, there is provided a frame generating device including an inserting portion and an accommodating portion. The inserting portion inserts a first fixed stuff byte into a payload area of an OPU frame of each of 80 OTU frames, the first fixed stuff byte being of (8+80n ("n" is zero or a given positive integer))×4 rows. The accommodating portion accommodates (95−n) tributary slot groups including 80 tributary slots in a payload area other than the first fixed stuff byte and treats the 80 OTU frames as a single multi frame period when accommodating a plurality of signal types in the OTU frame, a unit of the tributary slot being 1 byte×4 rows, each two of the 80 OPU frames being treated as a single group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates main client signal types that may be stored in OTU4/ODU4/OPU4;

FIG. 6 illustrates a control of JC byte, NJO byte and PJO byte;

FIG. 14 illustrates a multiplexing method of 40-multi frames processing;

FIG. 16 illustrates a control condition of JC byte, NJO and PJO;

FIG. 17 illustrates JC amount that is required when ODU4 accommodates each client signal;

FIG. 19 illustrates another example of OTU4/ODU4/OPU4 frame in a case where ODUk is multiplexed in addition to 100 Gb Ethernet;

FIG. 26 illustrates main client signal type that may be stored in OTU4/ODU4/OPU4;

FIG. 28 illustrates a control condition of JC byte, NJO and PJO; and

FIG. 29 illustrates JC amount that is required when ODU4 accommodates each client signal.

DESCRIPTION OF EMBODIMENTS

The following is a description of embodiments of the present invention, with reference to the accompanying drawings.

[a] First Embodiment

Figure 1A:
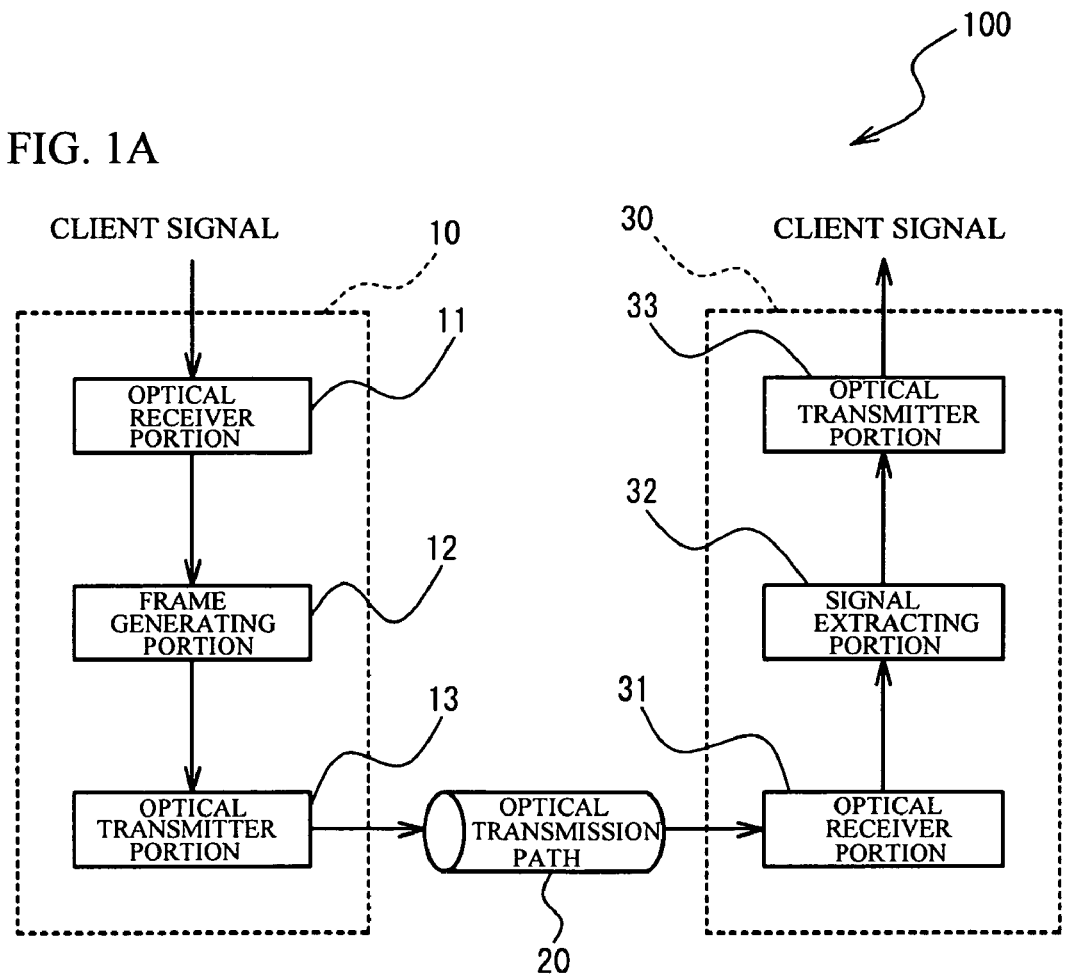
FIG. 1A and FIG. 1B illustrate a schematic view of an optical transmission system including an optical transmitter device in accordance with a first embodiment.
Figure 1B:
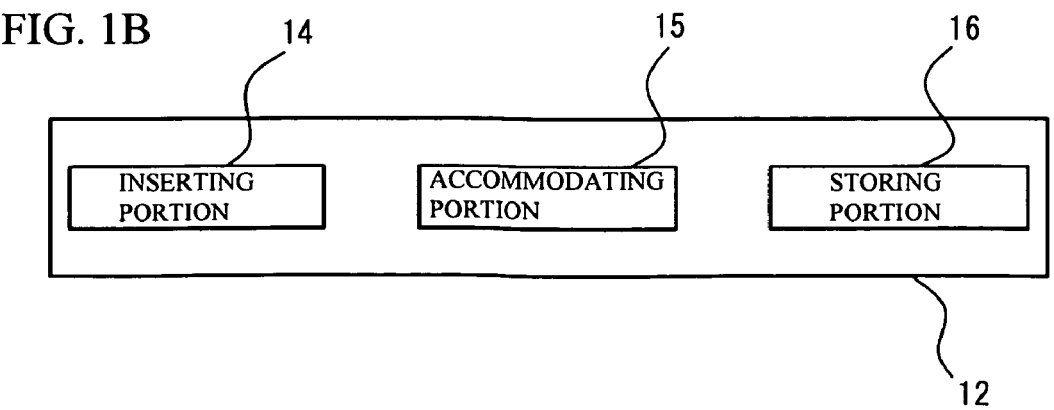

FIG. 1A and FIG. 1B illustrate a schematic view of an optical transmission system 100 including an optical transmitter device 10 in accordance with a first embodiment. As illustrated in FIG. 1A, the optical transmission system 100 includes the optical transmitter device 10 acting as a frame generating device, an optical transmission path 20 and an optical receiver device 30. The optical transmitter device 10 includes an optical receiver portion 11, a frame generating portion 12, and an optical transmitter portion 13. The optical receiver device 30 includes an optical receiver portion 31, a signal extracting portion 32 and an optical transmitter portion 33. As illustrated in FIG. 1B, the frame generating portion 12 includes an inserting portion 14, an accommodating portion 15, and a storing portion 16.

The optical receiver portion 11 receives a client signal fed into the optical transmitter device 10. The frame generating portion 12 accommodates the client signal received by the optical receiver portion 11 in an OTU frame. Details of an operation of each component of the frame generating portion 12 will be described later. The optical transmitter portion 13 transmits the OTU frame accommodating the client signal to the optical transmission path 20.

The OTU frame transmitted via the optical transmission path is fed into the optical receiver device 30. The optical receiver portion 31 receives the OTU frame fed into the optical receiver device 30. The signal extracting portion 32 extracts the client signal accommodated in the OTU frame received by the optical receiver portion 31. The optical transmitter portion 33 transmits the extracted client signal to a client terminal or the like. The client signal used in the embodiment is an Ethernet frame.

Figure 2:
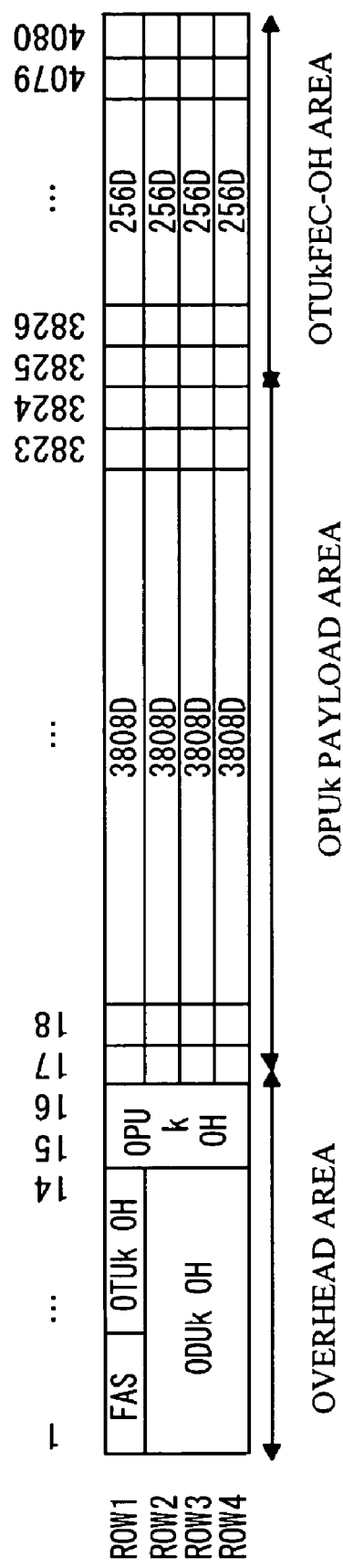
FIG. 2 illustrates a format of an OTU frame.

FIG. 2 illustrates a format of the OTU frame. As illustrated in FIG. 2, the OTU frame includes an overhead area, an OPUk (Optical channel Payload Unit) payload area, and an OTUk-FEC (Optical channel Transport Unit Forward Error Correction) overhead area.

The overhead area has a frame size of 16 byte from first column to 16th column×4 rows, and is used for management for a connection and an administration of quality. The OPUk payload area has a frame size of 3808 bytes from 17th column to 3824th column×4 rows, and accommodates a client signal providing more than one service. The OTUkFEC overhead area has a frame size of 256 bytes from 3825th column to 4080th column×4 rows, and is used for correction of an error of transmission.

The OPUk payload area, to which an overhead byte used for management for connection and administration of quality is added, is referred to as an ODUk (Optical channel Data Unit) area. The ODUk area, to which an overhead byte used for frame synchronization, connection and administration of quality and the OTUkFEC overhead are added, is referred to as an OTUk (Optical channel Transport Unit) area.

In the embodiment, a description will be given of generation of an OTN frame for accommodating and transmitting of Ethernet signal having 100 Gbps bit rate and signals that may be accommodated in conventional OTN. Here, an OTN frame in the embodiment is referred to as OTU4/ODU4/OPU4.

FIG. 3 illustrates main client signal types that may be accommodated in the OTU4/ODU4/OPU4. As illustrated in FIG. 3, the payload area of the OTU4/ODU4/OPU4 accommodates a single 100 Gb Ethernet having a bit rate of 103.125 Gbps. The payload area of the OTU4/ODU4/OPU4 accommodates multiplexed ODU3, ODU2, ODU1 or ODU2e. The ODU3, the ODU2 and the ODU1 are an ODUk that is an OTN frame and is described in ITU-T G709 recommendation. The ODU2e is described in ITU-T G supplement 43.

A signal having the highest bit rate of the above-mentioned main client signal types is 10 multiplexed ODU2e. The frame generating portion 12 generates the OTU4/ODU4/OPU4 frame so that the OPU4 payload area has a bit rate higher than that of the 10 multiplexed ODU2e. A description will be given of a structure of the OTU4/ODU4/OPU4 frame.

Figure 4:
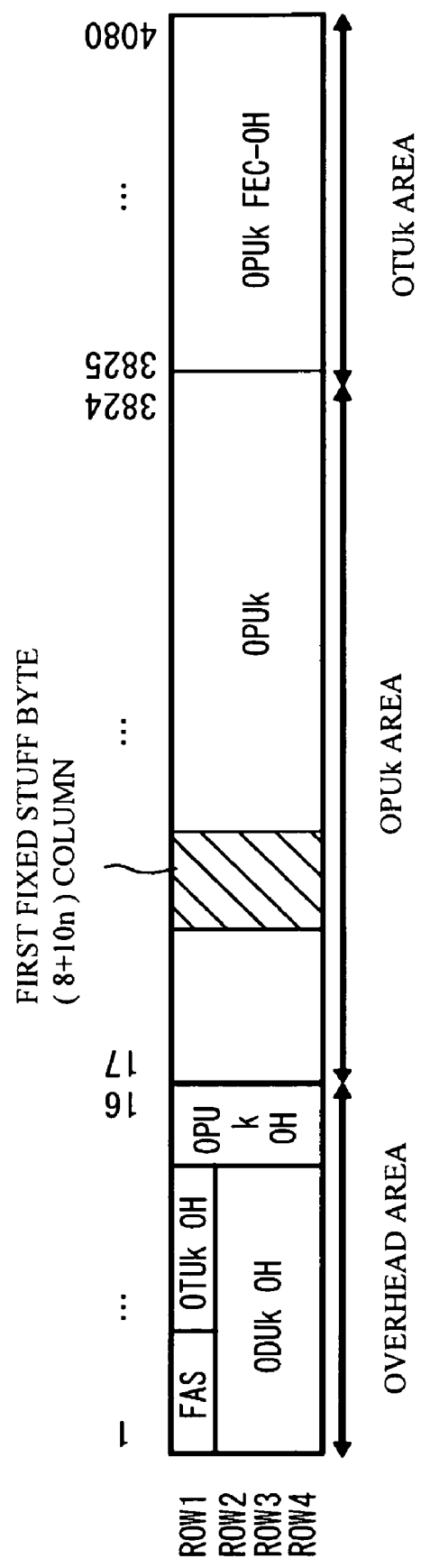
FIG. 4 illustrates an example of a structure of OTU4/ODU4/OPU4 frame accommodating 100 Gb Ethernet.

FIG. 4 illustrates an example of a structure of the OTU4/ODU4/OPU4 frame accommodating 100 Gb Ethernet. As illustrated in FIG. 4, the inserting portion 14 of FIG. 1B inserts a first fixed stuff byte of (8+10n ("n" is zero or a given positive integer))×4 rows in the OPU4 payload area. The accommodating portion 15 accommodates the 100 Gb Ether signal in an area other than the first fixed stuff byte.

In this case, it is easy to accommodate a signal having a bit rate of 10 times rule, because 3808−(8+10n)=(3800−10n) is a multiple number of 10. Therefore, the OTU4/ODU4/OPU4 frame is capable of accommodating the ODU3, the ODU2e, the ODU2, ODU1 or the like in addition to the 100 Gb Ethernet signal.

The inserting portion 14 inserts a given number of a second fixed stuff byte if the bit rate of the OPU4 payload area of the OTU4/ODU4/OPU4 frame is lower than that of 10 multiplexed ODU2e. Here, a following expression has only to be satisfied when the second fixed stuff byte has x bytes.

$$3808/(3808-(8+10n)-x) \times 103.125 > 103.995 \quad \text{(Expression 1)}$$

An expression "x ≧24−10n" may be obtained from Expression 1. Therefore, the inserting portion 14 inserts the second fixed stuff byte of a given byte×4 rows, the given byte being equal to zero or more and being equal to (24−10n) or more. Thus, each client signal type may be accommodated in addition to the 100 Gb Ethernet signal. However, it is preferable that byte number of the second fixed stuff is as low as possible, because it is preferable that the bit rate is low.

It is preferable that above-mentioned "n" is equal to zero. In this case, the OPU4 payload area is capable of accommodating a plurality of signal types, because row number of the OPU4 payload area capable of accommodating each client signal is 3800. This is because "3800" is a multiple of 2.5, 10, and 40 and the row number of the OPU4 payload is capable of such as 40 Gbps signal, 10 Gbps signal and 2.5 Gbps signal.

It is preferable that at least a column of the first fixed stuff is located on the 17th column of the OTU4/ODU4/OPU4 frame. In this case, the column of the first fixed stuff byte is adjacent to the overhead area. Therefore, the column is capable of accommodating an overhead byte for frequency adjustment (JC: Justification Control). It is therefore possible to adjust the frequency.

It is preferable that the inserting portion 14 inserts two of fixed stuff bytes 16 bytes×4 rows as a second stuff byte, if "n" is zero. In this case, a bit rate of the OTU4/ODU4/OPU4 frame is higher than that of 10 multiplexed ODU2e. Particularly, it is preferable that the inserting portion 14 inserts the two fixed stuff bytes into 1265th column to 1280th column and 2545th column to 2560th column. This is because a general signal circuit may be used.

Figure 5:
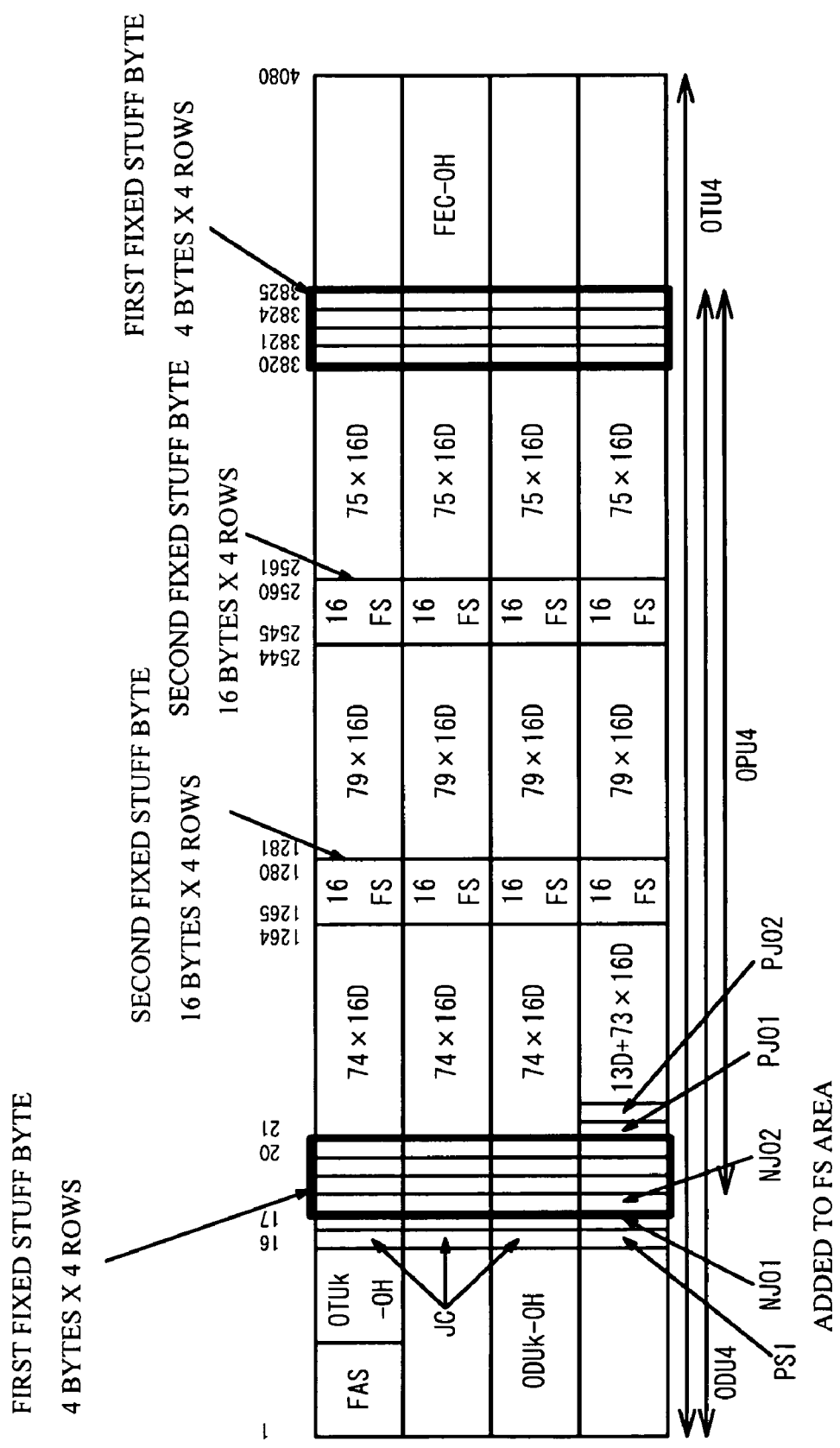
FIG. 5 illustrates OTU4/ODU4/OPU4 frame in a case where "n" is equal to zero.

FIG. 5 illustrates the OTU4/ODU4/OPU4 frame in a case where "n" is equal to zero. As illustrated in FIG. 5, the inserting portion 14 may insert the first stuff byte (two of 4 bytes×4 rows) into the OPU4 payload area. In FIG. 5, the inserting portion 14 inserts 4 bytes×4 rows of the first fixed stuff into 17th column to 20th column and inserts the rest into 3821th column to 3824th column. In this case, the columns of the payload area capable of accommodating 100 Gb Ethernet are 21th column to 3820th column. Therefore, it is easy to identify the index of each column.

The storing portion 16 of FIG. 1 may store a JC byte in the first column of the first fixed stuff. In this case, the frame generating portion 12 is capable of inserting another monitoring control byte in the other columns. For example, the monitoring control byte may be negative stuff byte (NJO: Negative Justification Opportunity), FEC (Forward Error Correction) byte, or the like.

The bit rate of the OTU4 illustrated in FIG. 5 is (255/239)× (3824/3768)×103.125 Gbps=111.664 Gbps. The bit rate of the ODU4 is (3824/3768)×103.125 Gbps=104.658 Gbps. In this case, the bit rate of the OPU4 payload area is (3808/3768)×103.125 Gbps=104.219 Gbps. Therefore, the bit rate of the OPU4 payload area is higher than the bit rate of 10×ODU2e.

The storing portion 16 may store a reserve byte in the first row to the third row of the 17th column of the first fixed stuff byte, and may store the negative stuff byte for frequency adjustment control in the fourth row of the first fixed stuff byte. The storing portion 16 may insert a positive stuff byte (PJO: Positive Justification Opportunity) in a byte located on the fourth row of the 21th column and in a byte located on the fourth row of the 22th column. The positive stuff byte acts as a data storing byte for absorbing frequency deviation of plus minus 100 ppm of 100 Gb Ethernet, together with the negative stuff byte of the OPU4 overhead.

FIG. 6 illustrates a control of the JC byte, the negative stuff byte and the positive stuff byte in this case. As illustrated in FIG. 6, it is controlled whether the negative stuff byte and the positive stuff byte store the client data (Data byte) or the frequency deviation adjustment JC byte, with lower 3 bit of the JC byte (the 6th bit to the 8th bit).

Figure 7:
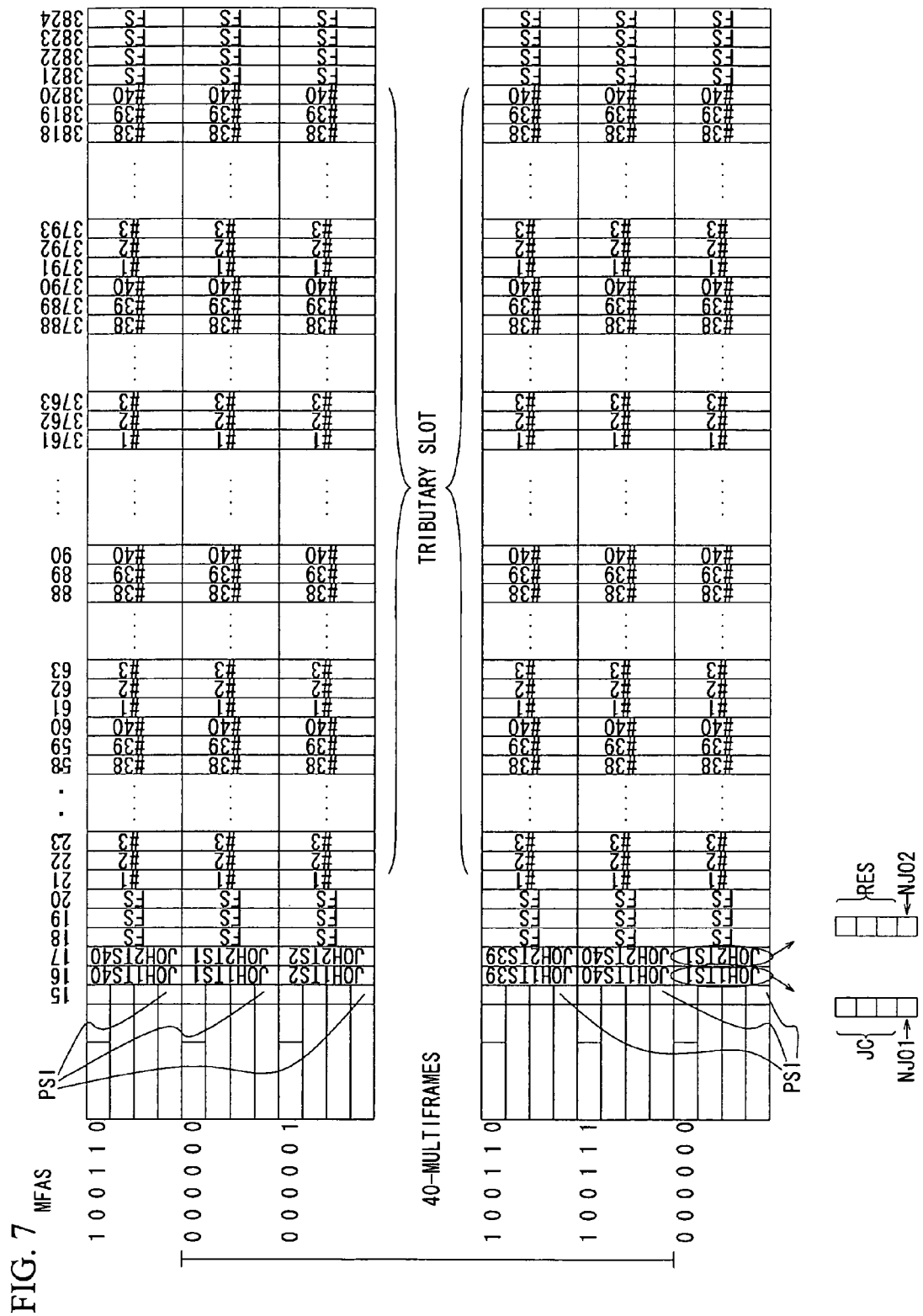
FIG. 7 illustrates an example of OTU4/ODU4/OPU4 frame structure in a case where ODUk is multiplexed and accommodated.

FIG. 7 illustrates an example of the OTU4/ODU4/OPU4 frame structure in a case where the ODUk (k=1, 2, 3, 2e) is multiplexed and accommodated. As illustrated in FIG. 7, the inserting portion 14 inserts the first fixed stuff byte of (8+40n ("n" is zero or a given positive integer))×4 rows into the OPU4 payload area. In this case, the row number other than the fixed stuff byte is a multiple of 40. Thus, the OPU4 payload area is capable of accommodating a signal such as 2.5 Gbps signal, 10 Gbps signal or 40 Gbps signal. In FIG. 7, "n" is equal to zero for simplifying the explanation.

The inserting portion 14, for example, inserts the first fixed stuff byte into 17th column to 20th column and 3821th column to 3824th column. The storing portion 16 stores the reserve byte in the first row to third row of the 17th column, and stores the negative stuff byte for frequency adjustment in the fourth row of the 17th column. The accommodating portion 15 defines the 17th column of the ODU4 frame as an additional Justification OH.

The accommodating portion 15 accommodates 95 of tributary slot groups having 40 tributary slots of which unit is 1 byte×4 rows in an area other than the first fixed stuff byte of each OPU4 frame. The accommodating portion 15 treats 40 types of OTU frame as a single multi frame period when the accommodating portion 15 accommodates a plurality of signal types in the OTU frame.

In FIG. 7, the tributary slot 1 (Tribslot#1) is allocated to the 21th, 61th, . . . 3791th columns of the ODUk frame. The tributary slot 40 (Tribslot#40) is allocated to the 60th, 100th, . . . 3820th column of the ODUk frame. Each of the tributary slots is capable of accommodating a signal different from each other. A bandwidth of the OTU frame of each tributary slot is 2.600019904 Gbps.

The accommodating portion 15 uses a single tributary slot when accommodating a single ODU1 signal in the ODU4. The accommodating portion 15 accommodates a single ODU2 signal or a single ODU2e signal in the ODU4 with four tributary slots. The accommodating portion 15 accommodates a single ODU3 signal in the ODU4 with 16 tributary slots. Therefore, the ODU4 is capable of accommodating 40 multiplexed ODU1 signals, 10 multiplexed ODU2 signals or ODU2e signals, or 2 multiplexed ODU3 signals at a maximum. Two ODU3 signals and two ODU2 signals or two ODU2e signals may be multiplexed into the ODU4, because different ODUk signal can be mixed.

Figure 8:
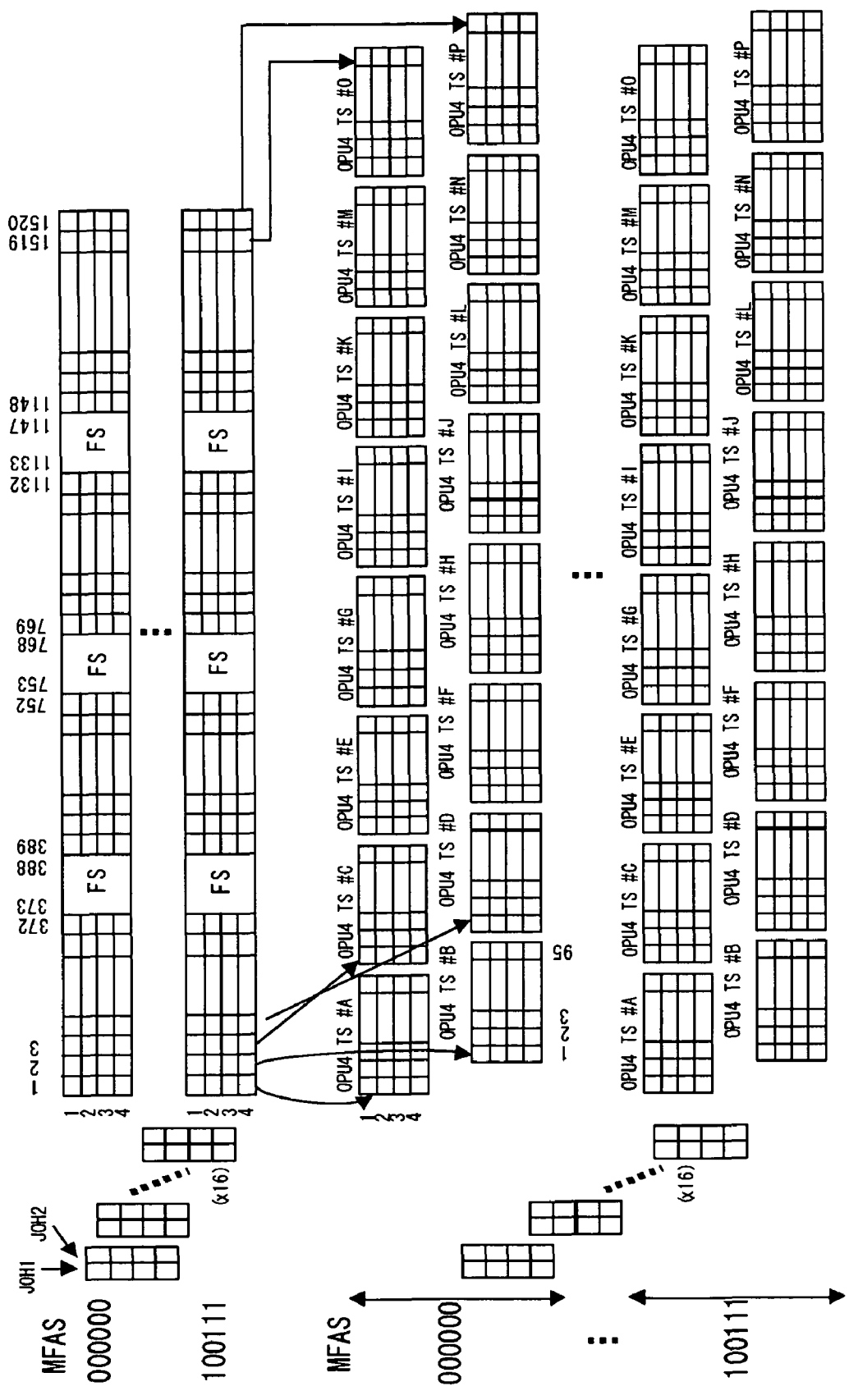
FIG. 8 illustrates a case where ODU4 accommodates ODU3 signal as a client signal.

FIG. 8 illustrates a case where the ODU4 accommodates the ODU3 signal as a client signal. In concrete, FIG. 8 illustrates a case where the ODU4 accommodates the ODU3 signal with a total of 16 tributary slot groups #A to #P. "#A" to "#P" is respectively an integer of 1 to 40, and has a relation of A<B<C<D<E<F<G<H<I<J<K<L<M<N<O<P.

The accommodating portion 15 accommodates the ODU3 signal in a frame having a frame size of 1520 bytes×4 rows before accommodating the ODU3 signal in each tributary slot group. The above-mentioned group including 40 frames is hereinafter referred to as an ODTU34 (Optical channel Data Tributary Unit 3 into 4). The accommodating portion 15 treats the ODTU34 frame as a unit, and accommodates a single ODTU34 frame into 40 ODU4 frames. That is, the accommodating portion 15 treats the ODTU34 frame as 40-multi frames.

The inserting portion 14 adds frequency adjustment byte (JOH1 and JOH2 in FIG. 8) of 2 bytes×4 rows to the ODTU34 frame having multi frame numbers of #A to #P. The inserting portion 14 inserts a fixed stuff byte so that a bit rate of the ODTU34 corresponding to that of 16 tributary slots is obtained. In the embodiment, the inserting portion 14 inserts the second fixed stuff byte (two of 16 bytes×4 rows and one of 15 bytes×4 rows) at every 1520 bytes×4 rows in the ODTU34 frame. The accommodating portion 15 accommodates the ODTU34 frame in the above-mentioned tributary slot groups #A to #P.

The inserting portion 14 inserts the JOH of 2 bytes×4 rows of the ODTU34 frame corresponding to the multi frame numbers into the 16th column and 17th column of the ODU4 frame, if the multi frame number of the ODU4 frame is #A to #P. With the processes, the ODU4 accommodates the ODU3 signal.

Figure 9:
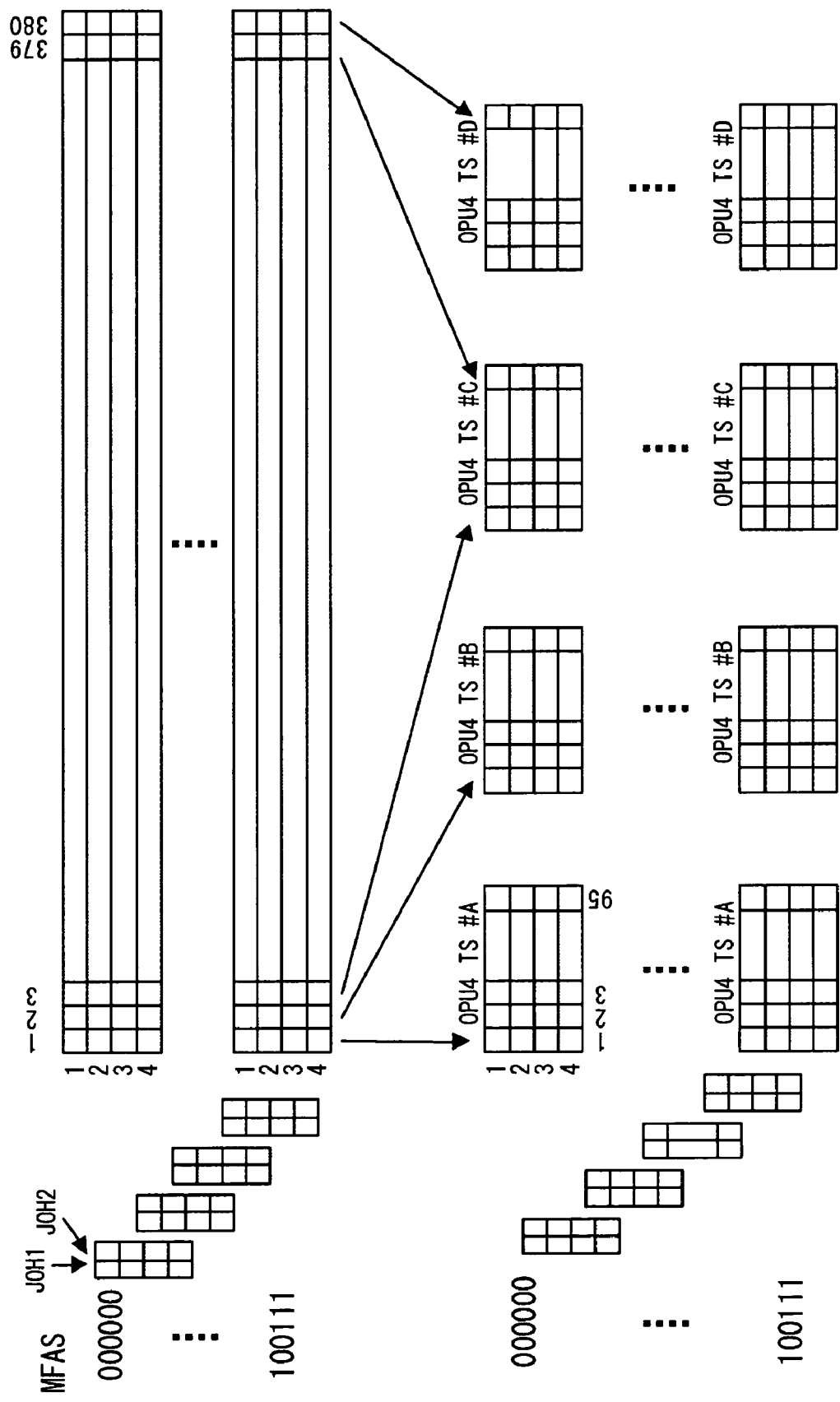
FIG. 9 illustrates a case where ODU4 frame accommodates ODU2e signal as a client signal.

FIG. 9 illustrates a case where the ODU4 frame accommodates the ODU2e signal as a client signal. In concrete, FIG. 9 illustrates a case where the ODU4 accommodates the ODU2e signal with a total of 4 tributary slot groups #A to #D. "#A" to "#D" is respectively an integer of 1 to 40, and has a relation of A<B<C<D.

The accommodating portion 15 accommodates the ODU2e signal in a frame having a frame size of 380 bytes×4 rows before accommodating the ODU2e signal in each tributary slot group. The above-mentioned group including 40 frames is hereinafter referred to as an ODTU2e4 (Optical channel Data Tributary Unit 2e into 4). The accommodating portion 15 treats the ODTU2e4 frame as a unit, and accommodates a single ODTU2e4 frame into 40 ODU4 frames. That is, the accommodating portion 15 treats the ODTU2e4 frame as a 40 multi frames.

The inserting portion 14 adds frequency adjustment byte (JOH1 and JOH2 in FIG. 9) of 2 bytes×4 rows into the ODTU2e4 frame having multi frame numbers of #A to #D. The accommodating portion 15 accommodates the ODTU2e4 frame in the above-mentioned tributary slot groups #A to #D. The inserting portion 14 inserts the JOH having 2 bytes×4 rows of the ODTU 2e4 frame corresponding to the multi frame numbers into the 16th column and 17th column of the ODU4 frame, if the multi frame number of the ODU 4 frame is #A to #D. With the processes, the ODU4 accommodates the ODU2e signal.

Figure 10:
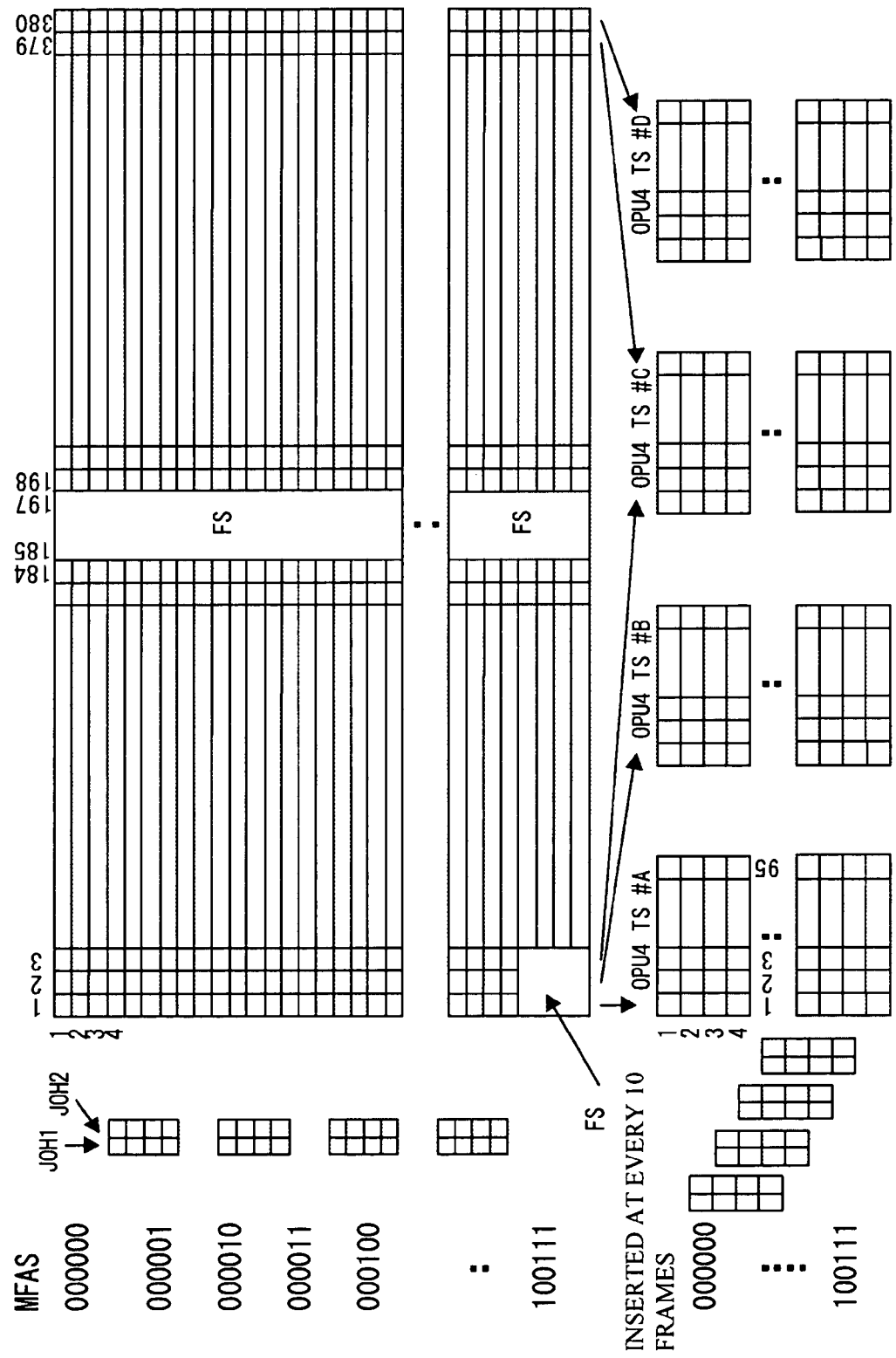
FIG. 10 illustrates a case where ODU4 accommodates ODU2 signal as a client signal.

FIG. 10 illustrates a case where the ODU4 accommodates the ODU2 signal as a client signal. In concrete, FIG. 10 illustrates a case where the ODU4 accommodates the ODU2 signal with a total of 4 tributary slot group #A to #D. "#A" to "#D" is respectively an integer of 1 to 40, and has a relation of A<B<C<D.

The accommodating portion 15 accommodates the ODU2 signal into a frame having a frame size of 380 bytes×4 rows before accommodating the ODU2 signal into each tributary slot group. The above-mentioned group including 40 frames is hereinafter referred to as an ODTU24 (Optical channel Data Tributary Unit 2 into 4). The accommodating portion 15 treats the ODTU24 frame as a unit, and accommodates a single ODTU24 frame into 40 ODU4 frames. That is, the accommodating portion 15 treats the ODTU24 frame as a 40 multi frames.

The inserting portion 14 adds frequency adjustment byte (JOH1 and JOH2 in FIG. 10) of 2 bytes×4 rows into the ODTU24 frame having multi frame numbers of #A to #D. The inserting portion 14 inserts a fixed stuff byte so that a bit rate of the ODTU24 corresponding to that of 4 tributary slots is obtained. In the embodiment, the inserting portion 14 inserts the second fixed stuff byte (13 bytes×4 rows) at every 380 bytes×4 rows in the ODTU24 frame, and inserts the third fixed stuff byte of 2 bytes×4 rows at every 10 multi frames of 380 bytes×4 rows structuring the ODTU23 frame. The accommodating portion 15 accommodates the ODTU24 frame in the above-mentioned tributary slot groups #A to #D.

The inserting portion 14 inserts the JOH having 2 bytes×4 rows of the ODTU24 frame corresponding to the multi frame numbers into the 16th column and 17th column of the ODU4 frame, if the multi frame number of the ODU4 frame is #A to #D. With the processes, the ODU4 accommodates the ODU2 signal.

Figure 11:
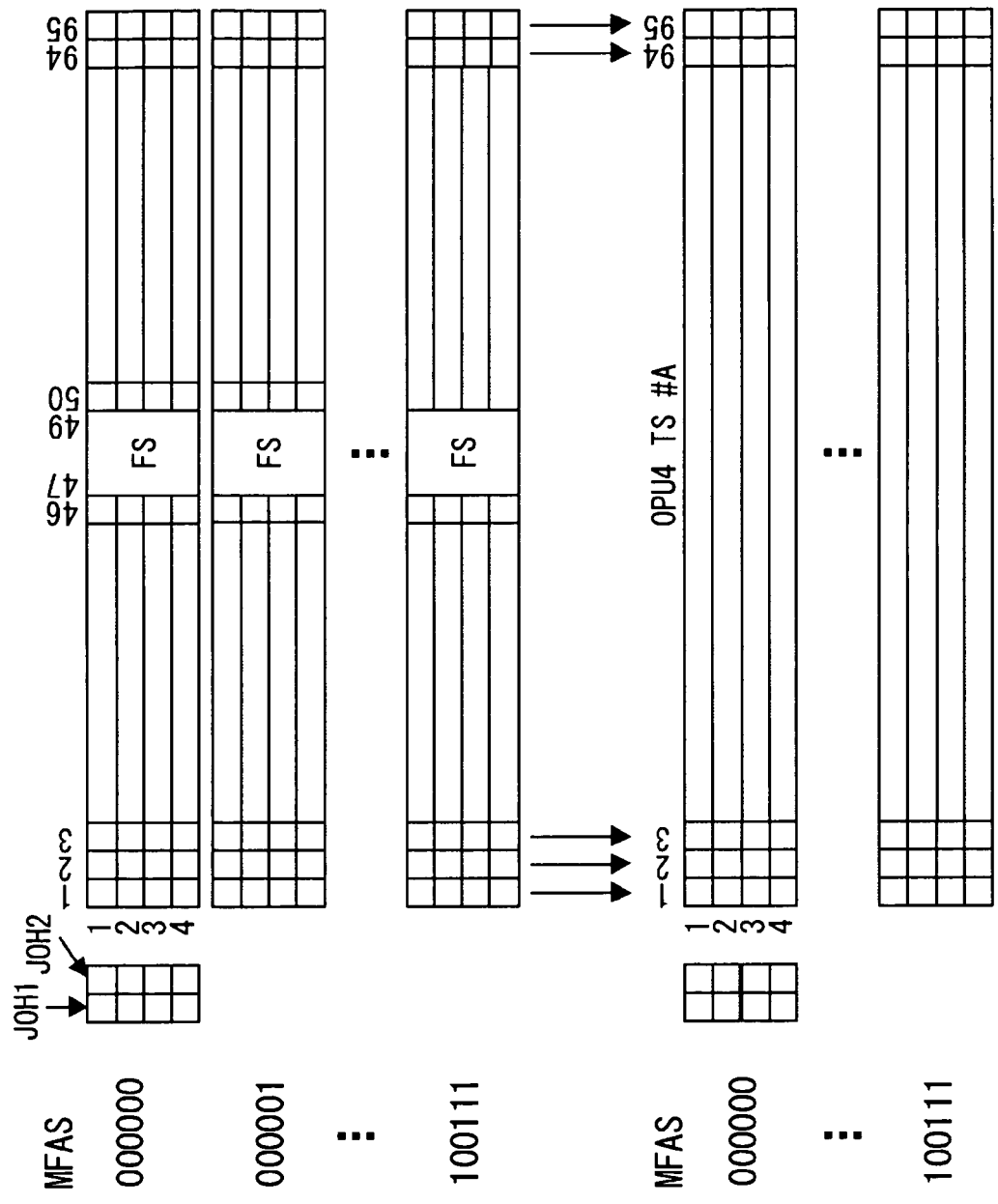
FIG. 11 illustrates a case where ODU4 accommodates ODU1 signal as a client signal.
Figure 12:
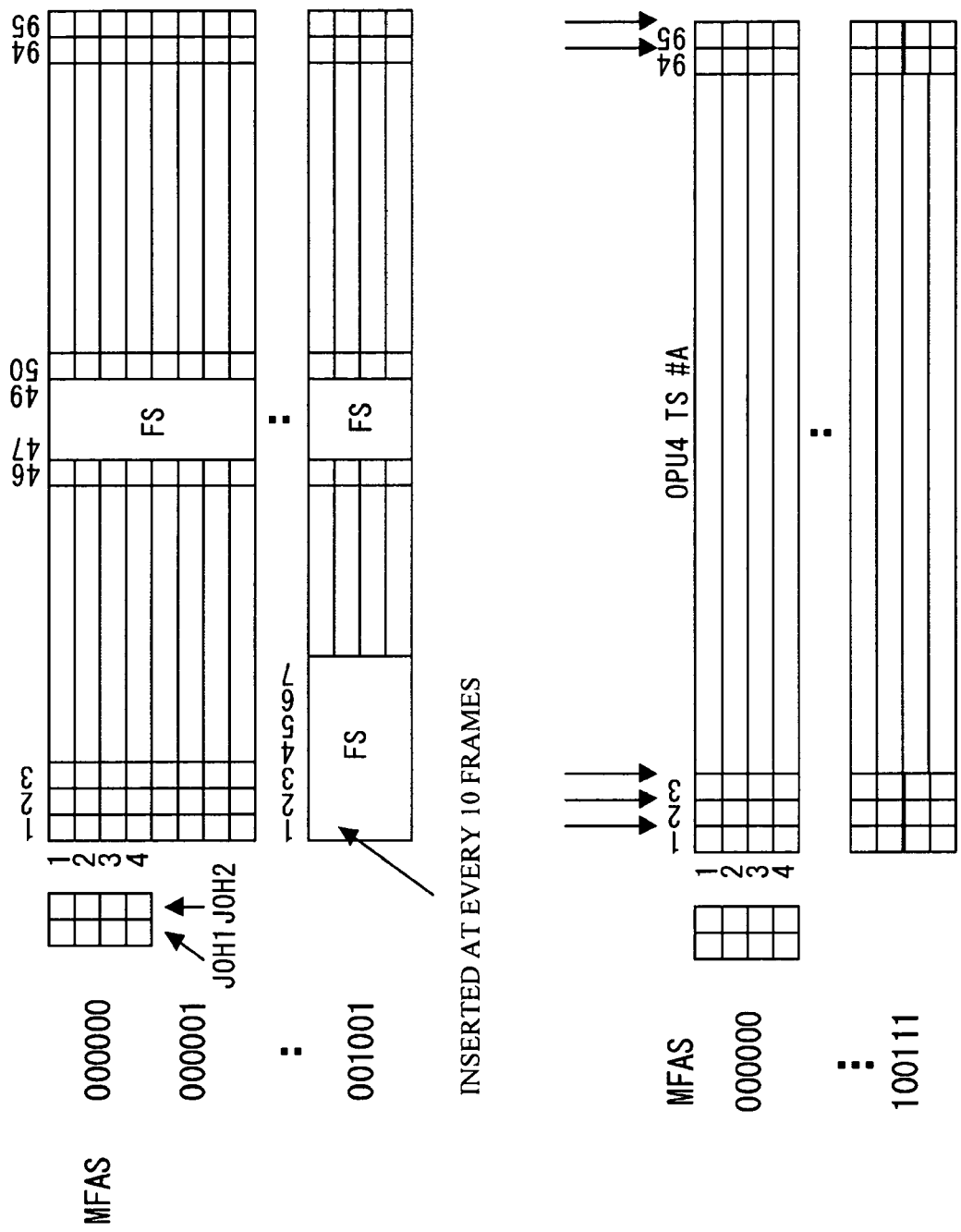
FIG. 12 illustrates a case where ODU4 accommodates ODU1 signal as a client signal.

FIG. 11 illustrates a case where the ODU4 accommodates the ODU1 signal as a client signal. In concrete, FIG. 11 illustrates a case where the ODU4 accommodates the ODU1 signal with a single tributary slot group #A. "#A" is an integer of 1 to 40.

The accommodating portion 15 accommodates the ODU1 signal in a frame having a frame size of 95 bytes×4 rows before accommodating the ODU1 signal in the tributary slot group. The above-mentioned group including 40 frames is hereinafter referred to as an ODTU14 (Optical channel Data Tributary Unit 1 into 4). The accommodating portion 15 treats the ODTU 14 frame as a unit, and accommodates a single ODTU14 frame into 40 ODU4 frames. That is, the accommodating portion 15 treats the ODTU14 frame as 40-multi frames.

The inserting portion 14 adds frequency adjustment byte (JOH1 and JOH2 in FIG. 11) of 2 bytes×4 rows into the ODTU14 frame having multi frame number of #A. The inserting portion 14 inserts a fixed stuff byte so that a bit rate of the ODTU14 corresponding to a single tributary slot is obtained. In the embodiment, the inserting portion 14 inserts the second fixed stuff byte of 3 bytes×4 rows at every 95 bytes×4 rows in the ODTU14 frame, and inserts the third fixed stuff byte of 7 bytes×4 rows at every 10 multi frame of 95 bytes×4 rows structuring the ODTU14 frame. The accommodating portion 15 accommodates the ODTU 14 frame in the above-mentioned tributary slot group #A.

The inserting portion 14 inserts the JOH having 2 bytes×4 rows of the ODTU14 frame corresponding to the multi frame numbers into the 16th column and 17th column of the ODU4 frame, if the multi frame number of the ODU4 frame is #A. With the processes, the ODU4 accommodates the ODU1 signal.

Figure 13:
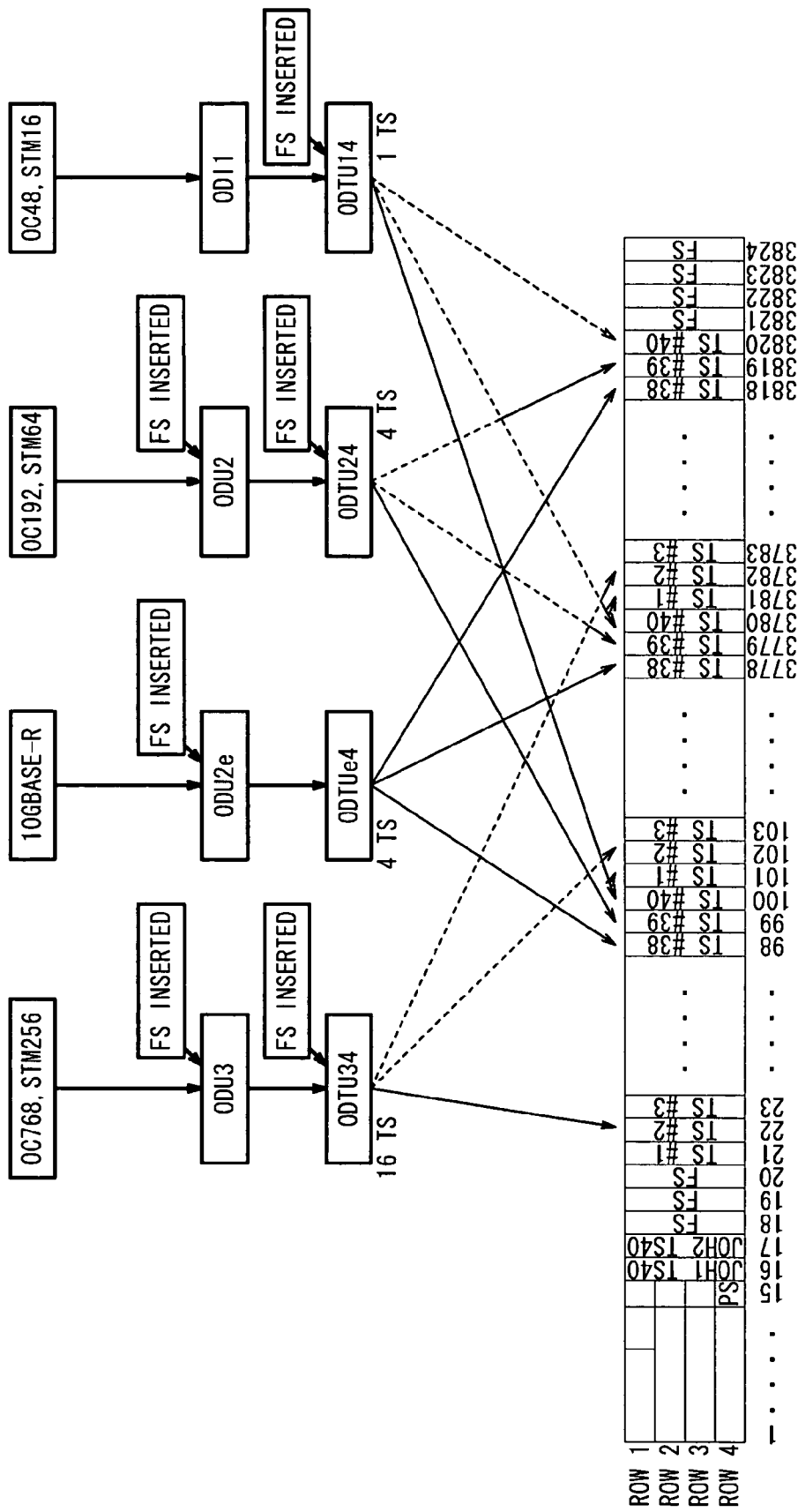
FIG. 13 illustrates a multiplexing method of 40-multi frames processing.

FIG. 13 and FIG. 14 illustrate a multiplexing method of the above-mentioned 40-multi frames processing. FIG. 13 and FIG. 14 illustrates "with" or "without" inserting of the second fixed stuff byte, necessary tributary slot group number, multiplexing number to the ODU4, and so on.

Figure 15:
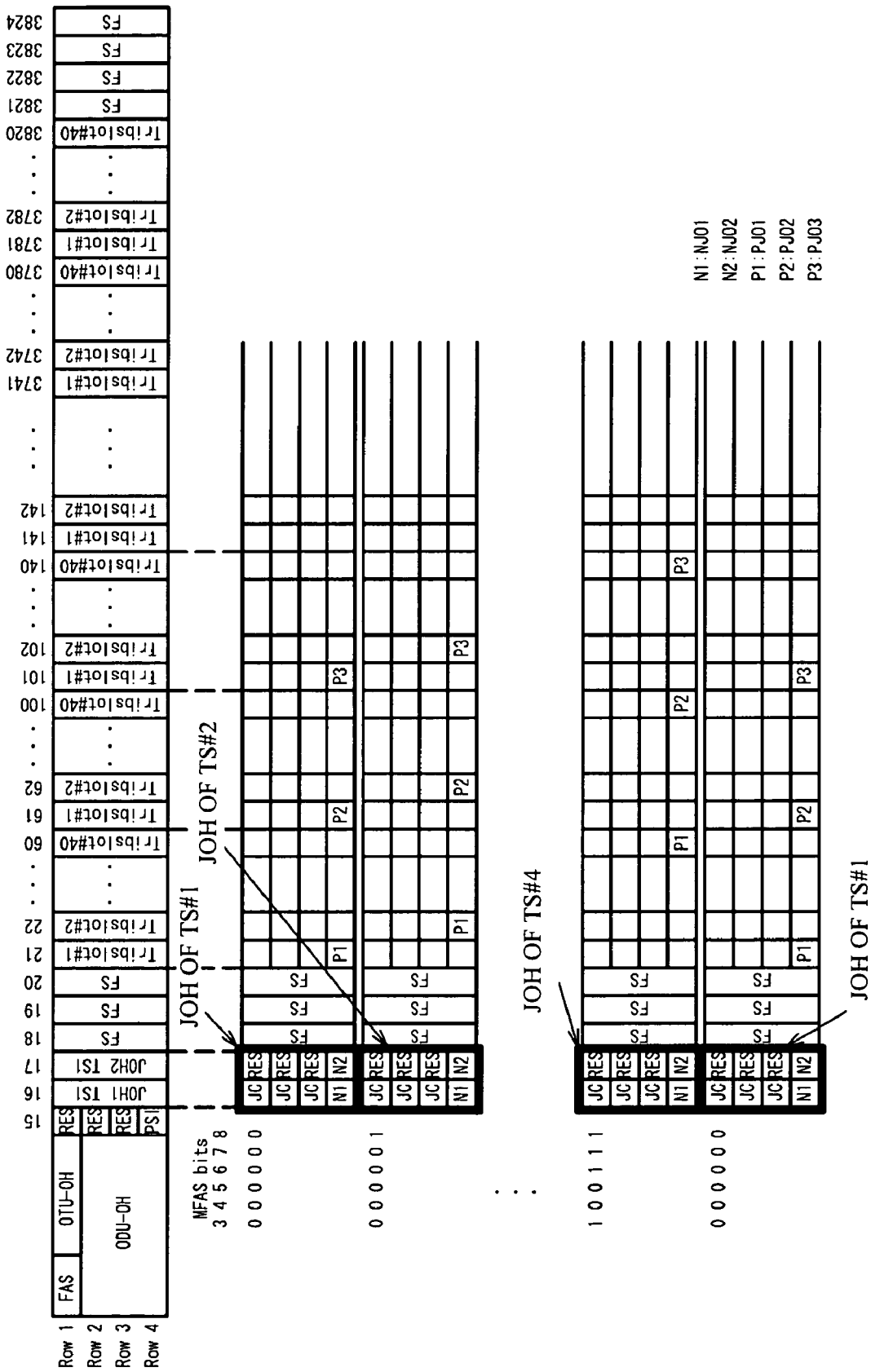
FIG. 15 illustrates an overhead for frequency deviation adjustment of ODU4 frame accommodating multiplexed ODUk signals.

FIG. 15 illustrates an overhead for frequency deviation adjustment of the ODU4 frame accommodating multiplexed ODUk signals. The inserting portion 14 inserts the JOH of a tributary slot group #i+1 into the 16th column and 17th column of the ODU4 frame of a multi frame #i. The inserting portion 14 inserts a first positive stuff byte (P1 in FIG. 15) of the tributary slot group #i into the fourth row of the 20+i th column, inserts a second positive stuff byte (P2 in FIG. 15) of the tributary slot group #i into the fourth row of the 60+i th column, and inserts a third positive stuff byte (P3 in FIG. 15) of the tributary slot group #i into the fourth row of the 100+i th column.

The inserting portion 14 inserts a first negative stuff byte (N1 in FIG. 15) and a second negative stuff byte (N2 in FIG. 15) into the fourth row of the JOH of the 16th column and the 17th column respectively. The inserting portion 14 inserts a JC overhead for stuff amount control into the first row to the third row of the 16th column.

FIG. 16 illustrates a control condition of the JC byte, each NJO {1, 2} and PJO {1, 2, 3}. It is controlled whether the NJO byte and the PJO byte store the client data (Data byte) or the Justification byte for the frequency deviation adjustment, with lower 3 bit of the JC byte (the 6th bit to the 8th bit).

FIG. 17 illustrates JC amount that is required when the ODU4 accommodates each client signal. The JC amount is (max) in FIG. 17 having opposite sign. Therefore, 2 bytes of NJO is required if (max) is +1.8087.

Figure 18:
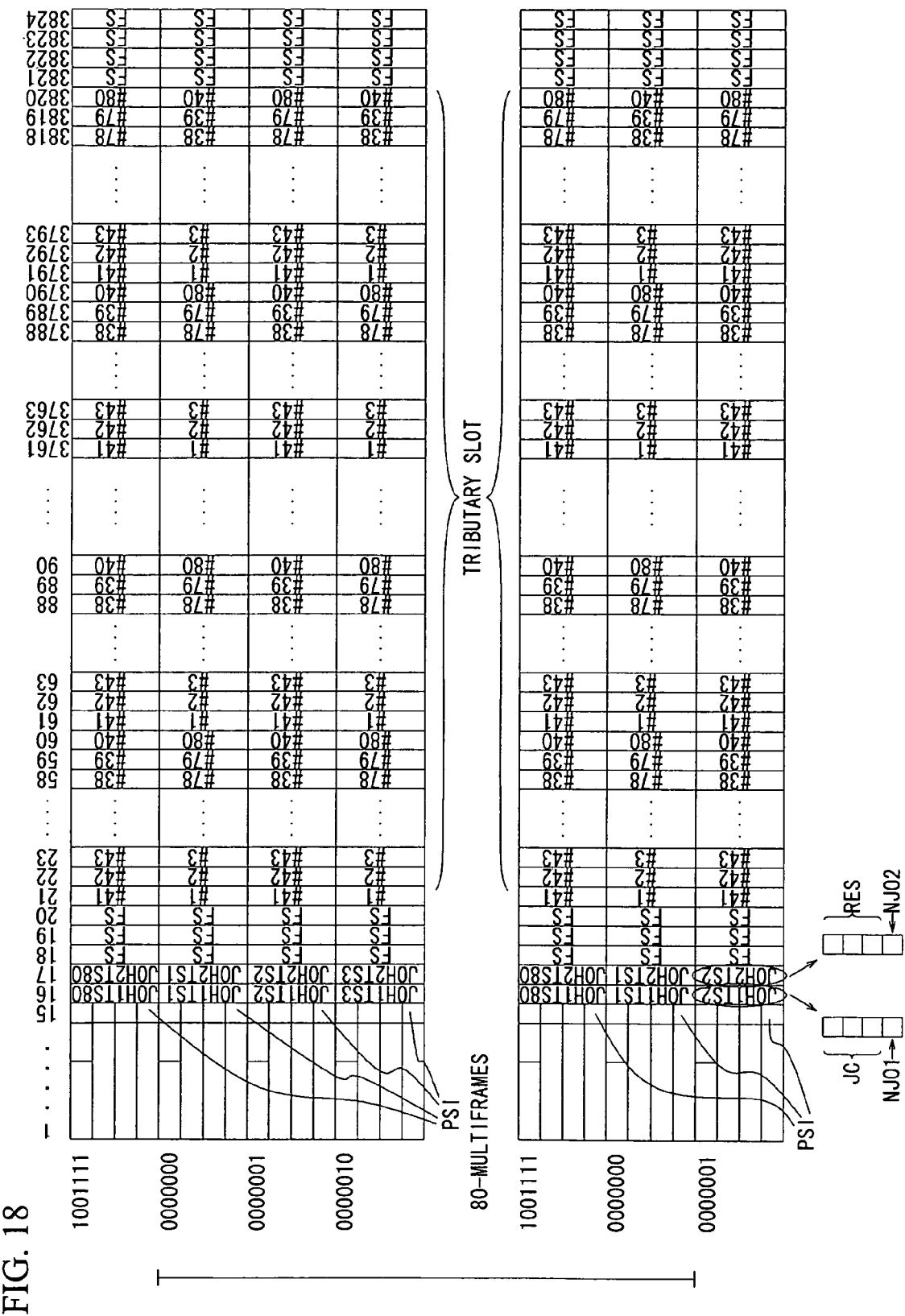
FIG. 18 illustrates another example of OTU4/ODU4/OPU4 frame in a case where ODUk is multiplexed in addition to 100 Gb Ethernet.

FIG. 18 illustrates another example of the OTU4/ODU4/OPU4 frame in a case where ODUk (k=0, 1, 2, 3, 2e) is multiplexed in addition to 100 Gb Ethernet. As illustrated in FIG. 18, the inserting portion 14 inserts the first fixed stuff byte of (8+40n ("n" is zero or a given positive integer))×4 rows in the OPU4 payload area. In this case, the row number other than the fixed stuff byte is a multiple of 40. Thus, the OPU4 payload area is capable of accommodating a signal such as 1.25 Gbps signal, 2.5 Gbps signal, 10 Gbps signal or 40 Gbps signal. In FIG. 18, "n" is equal to zero for simplifying the explanation.

The inserting portion 14, for example, maps the first fixed stuff byte into the 17th to 20th column and the 3821th to 3824th column of the ODU4 frame. The storing portion 16 stores the reserve byte in the first to third row of the 17th column, and stores the negative stuff byte for frequency adjustment into the fourth row. The accommodating portion 15 defines the 17th column of the ODU4 frame as an additional Justification OH.

The accommodating portion 15 accommodates 47.5 of tributary slot groups having 80 tributary slots of which unit is 1 byte×4 rows in an area other than the first fixed stuff byte of each OPU4 frame. In concrete, the accommodating portion 15 accommodates 47 groups of tributary slots 1 to 80 and one group of tributary slots 1 to 40 in the odd number OTU frame. The accommodating portion 15 accommodates 47 groups of tributary slots 1 to 80 and one group of tributary slots 41 to 80 in the even number OTU frame. The accommodating portion 15 treats 80 OTU frame as a single multi frame period when the accommodating portion 15 accommodates a plurality of signals in the OTU frame.

As illustrated in FIG. 19, the tributary slot 1 (Tribslot#1) is allocated to the 21th, 101th, . . . 3781th columns of the ODUk frame of the odd number OTU frame. The tributary slot 1 (Tribslot#1) is allocated to the 61th, 141th, . . . 3741th columns of the ODUk frame of the even number OTU frame. The tributary slot 80 (Tribslot#80) is allocated to the 100th, 180th, . . . 3780th column of the ODUk frame of the odd number OTU frame. The tributary slot 80 (Tribslot#80) is allocated to the 60th, 140th, . . . 3820th column of the ODUk frame of the even number OTU frame. Each of the tributary slots is capable of accommodating signal different from each other. A bandwidth of the OTU frame of each tributary slot is 1.300009952 Gbps.

The accommodating portion 15 uses a single tributary slot when accommodating a single ODU0 signal in the ODU4. The accommodating portion 15 uses two tributary slots when accommodating a single ODU1 signal in the ODU4. The accommodating portion 15 accommodates a single ODU2 signal or a single ODU2e signal in the ODU4 with 8 tributary slots. The accommodating portion 15 accommodates a single ODU3 signal in the ODU4 with 32 tributary slots. Therefore, the ODU4 is capable of accommodating 80 multiplexed ODU0 signal, 40 multiplexed ODU1 signals, 10 multiplexed ODU2 signals or ODU2e signals, or 2 multiplexed ODU3 signals at a maximum. Two ODU3 signals and two ODU2 signals or two ODU2e signals may be multiplexed into the ODU4, because different ODUk signal may be mixed.

Figure 20:
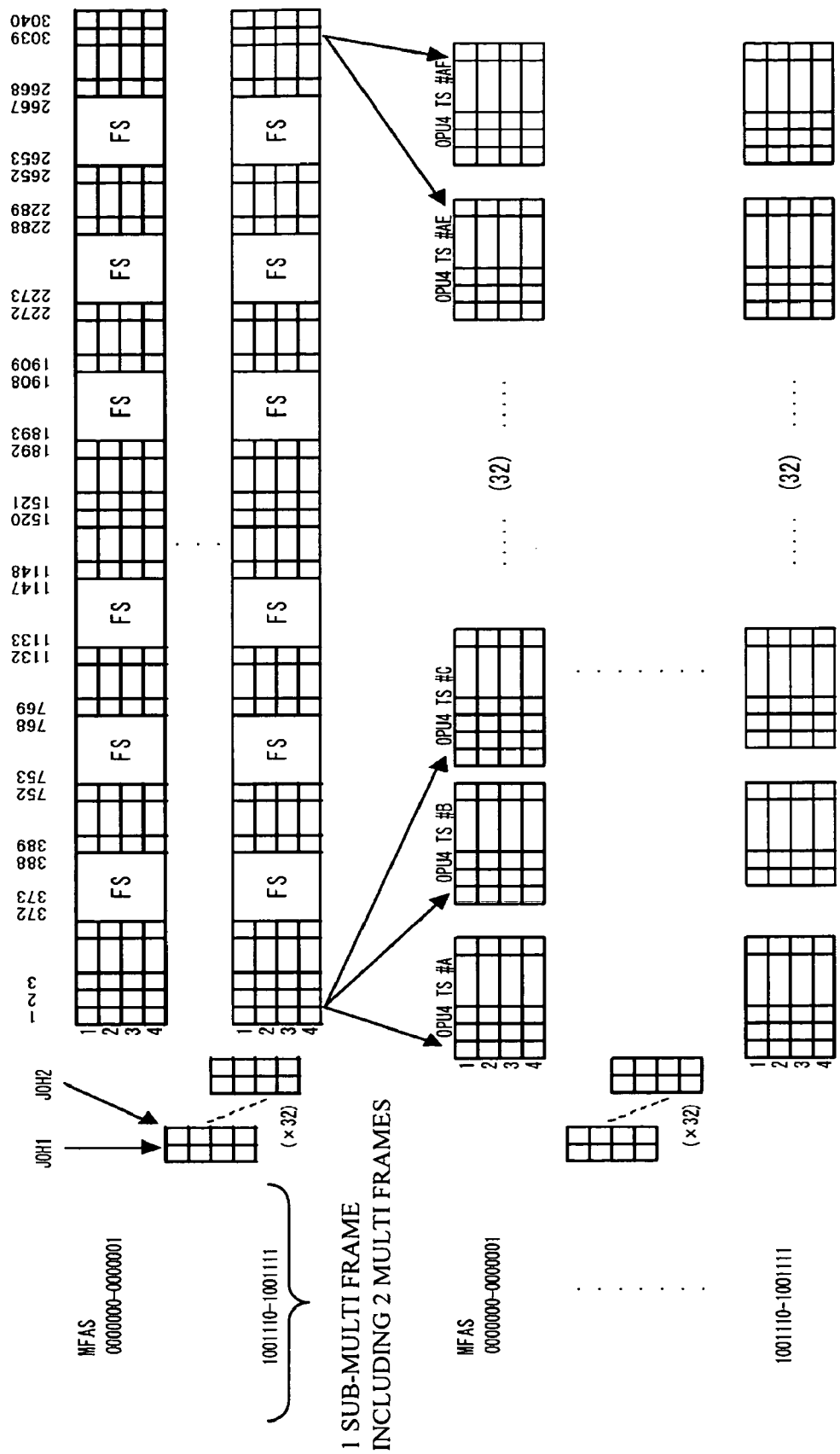
FIG. 20 illustrates a case where ODU4 accommodates ODU3 signal as a client signal.

FIG. 20 illustrates a case where the ODU4 accommodates the ODU3 signal as a client signal. In concrete, FIG. 20 illustrates a case where the ODU4 accommodates the ODU3 signal with a total of 32 tributary slot groups #A to #Z and #AA to #AF. "#A" to "#AF" is respectively an integer of 1 to 80, and has a relation of A<B<C<D<E<F<G<H<I<J<K<L<M<N<O<P<Q<R<S<T<U<V<W<X<Y<Z<AA<A B-<AC<AD<AE<AF.

The accommodating portion 15 accommodates the ODU3 signal in a frame having a frame size of 3040 bytes×4 rows before accommodating the ODU3 signal in each tributary slot group. The above-mentioned group including 40 frames is hereinafter referred to as an ODTU34 (Optical channel Data Tributary Unit 3 into 4). The accommodating portion 15 treats the ODTU34 frame as a unit, and accommodates a single ODTU34 frame into 80 ODU4 frames. That is, the accommodating portion 15 treats the ODTU34 frame as 80-multi frames. The accommodating portion 15 treats two multi frames including the odd number ODU4 frame and the even number ODU4 frame as a single sub-multi frame. Therefore, the accommodating portion 15 is capable of accommodating a single ODTU34 frame into 40 sub-multi-frames.

The inserting portion 14 adds frequency adjustment byte (JOH1 and JOH2 in FIG. 20) of 2 bytes×4 rows into the ODTU34 frame having multi frame numbers of #A to #AF. The inserting portion 14 inserts a fixed stuff byte so that a bit rate of the ODTU34 corresponding to that of 32 tributary slots is obtained. In the embodiment, the inserting portion 14 inserts the second fixed stuff byte (four of 16 bytes×4 rows and two of 15 bytes×4 rows) at every 3040 bytes×4 rows in the ODTU34 frame. The accommodating portion 15 accommodates the ODTU34 frame in the above-mentioned tributary slot groups #A to #AF.

The inserting portion 14 inserts the JOH having 2 bytes×4 rows of the ODTU34 frame corresponding to the multi frame numbers into the 16th column and 17th column of the ODU4 frame, if the multi frame number of the ODU4 frame is #A to #AF. With the processes, the ODU4 accommodates the ODU3 signal.

Figure 21:
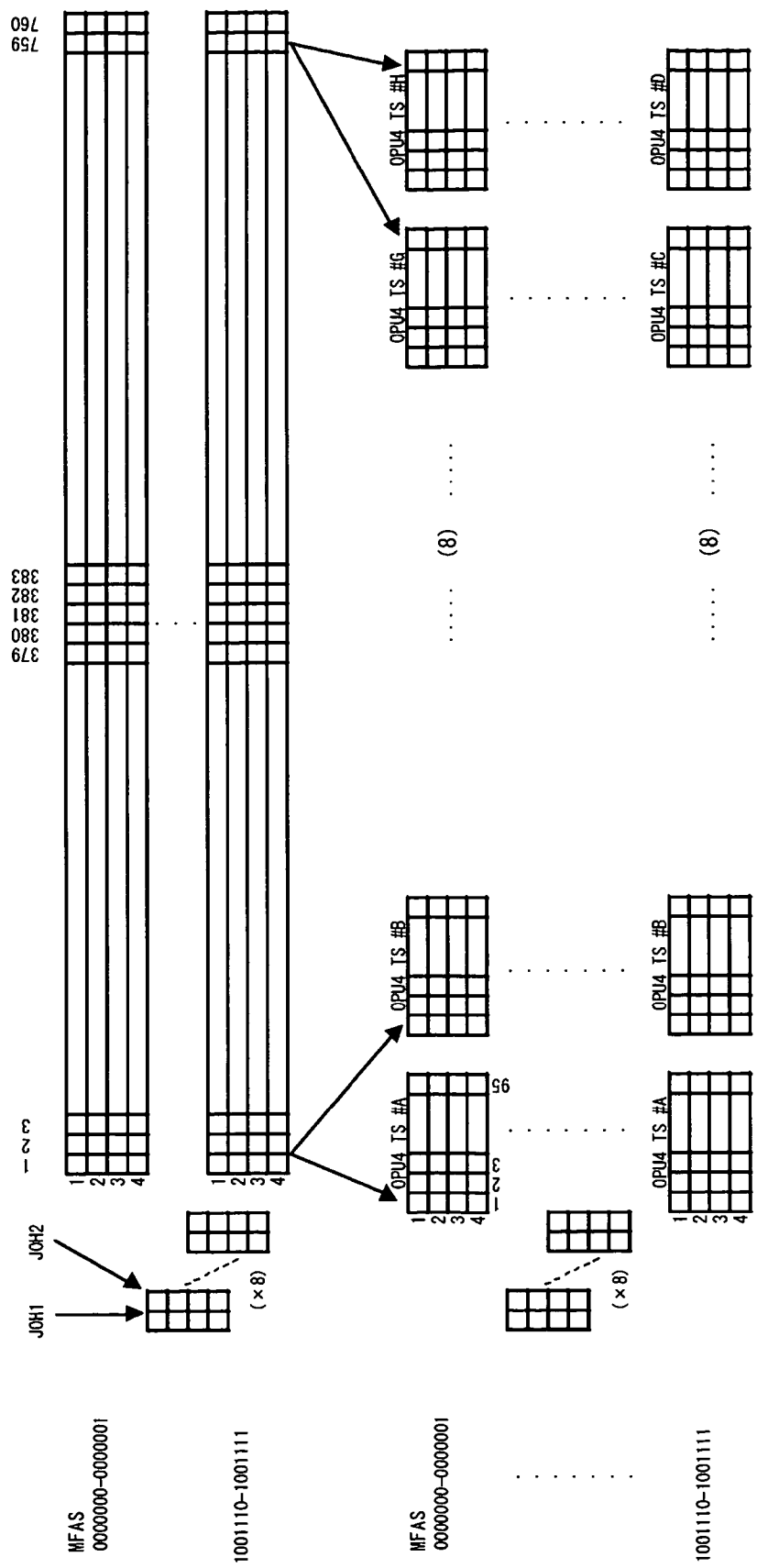
FIG. 21 illustrates a case where ODU4 accommodates ODU2e signal as a client signal.

FIG. 21 illustrates a case where the ODU4 frame accommodates the ODU2e signal as a client signal. In concrete, FIG. 21 illustrates a case where the ODU4 accommodates the ODU2e signal with a total of 8 tributary slot groups #A to #H. "#A" to "#H" is respectively an integer of 1 to 80, and has a relation of A<B<C<D<E<F<G<H.

The accommodating portion 15 accommodates the ODU2e signal in a frame having a frame size of 760 bytes×4 rows before accommodating the ODU2e signal in each tributary slot group. The above-mentioned frame including 40 frames is hereinafter referred to as an ODTU2e4 (Optical channel Data Tributary Unit 2e into 4). The accommodating portion 15 treats the ODTU2e4 frame as a unit, and accommodates a single ODTU2e4 frame into 80 ODU4 frames. That is, the accommodating portion 15 treats the ODTU2e4 frame as 80-multi frames. The accommodating portion 15 treats two multi frames including the odd number ODU4 frame and the even number ODU4 frame as a single sub-multi frame. Therefore, the accommodating portion 15 is capable of accommodating a single ODTU2e4 frame into 40 sub-multi-frames.

The inserting portion 14 adds frequency adjustment byte (JOH1 and JOH2 in FIG. 21) of 2 bytes×4 rows into the ODTU2e4 frame having multi frame numbers of #A to #H. The accommodating portion 15 accommodates the ODTU2e4 frame in the above-mentioned tributary slot groups #A to #H. The inserting portion 14 inserts the JOH having 2 bytes×4 rows of the ODTU 2e4 frame corresponding to the multi frame numbers into the 16th column and 17th column of the ODU4 frame, if the multi frame number of the ODU4 frame is #A to #H. With the processes, the ODU4 accommodates the ODU2e signal.

Figure 22:
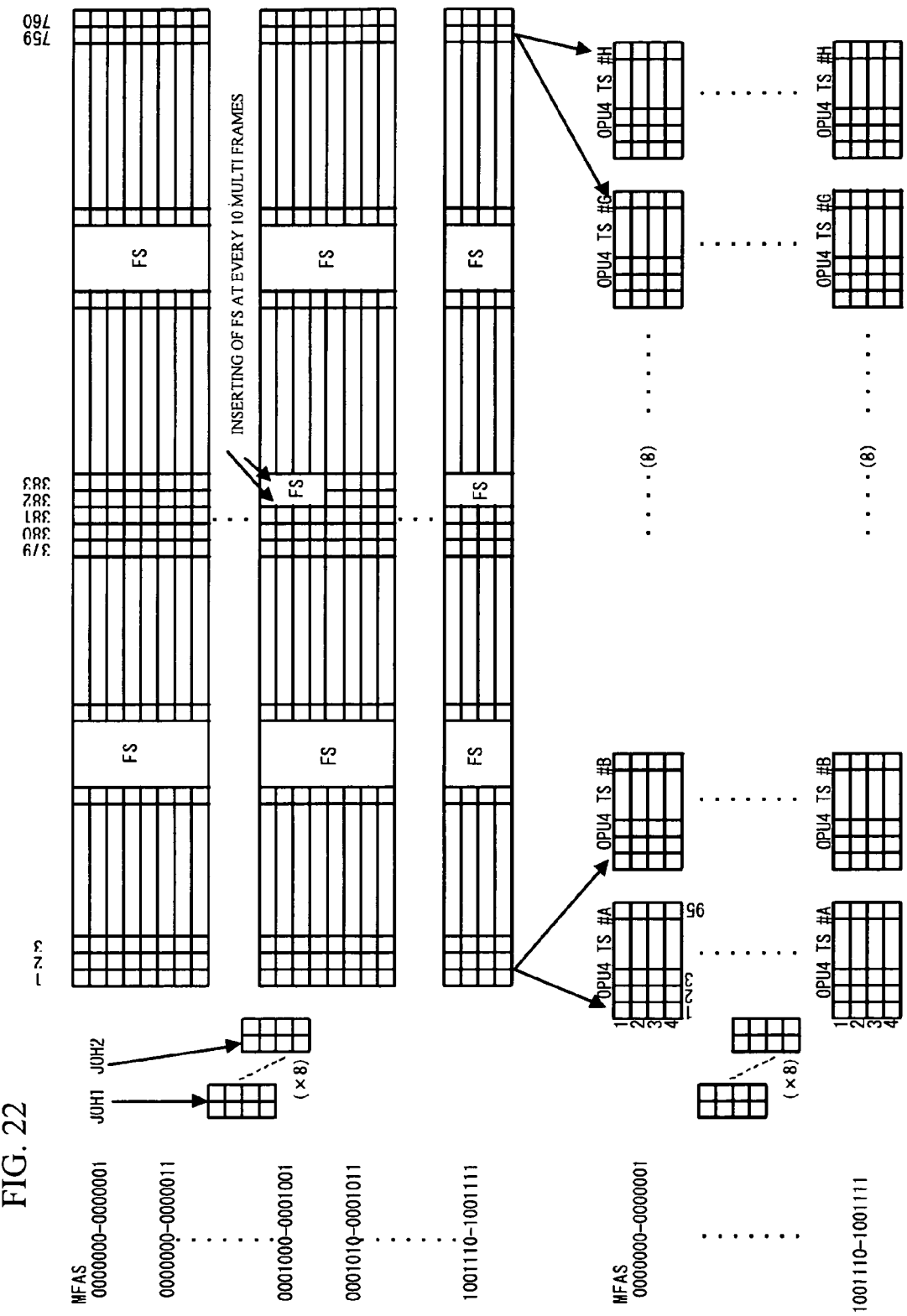
FIG. 22 illustrates a case where ODU4 accommodates ODU2 signal as a client signal.

FIG. 22 illustrates a case where the ODU4 accommodates the ODU2 signal as a client signal. In concrete, FIG. 22 illustrates a case where the ODU4 accommodates the ODU2 signal with a total of 8 tributary slot groups #A to #H. "#A" to "#H" is respectively an integer of 1 to 80, and has a relation of A<B<C<D<E<F<G<H.

The accommodating portion 15 accommodates the ODU2 signal in a frame having a frame size of 760 bytes×4 rows before accommodating the ODU2 signal in each tributary slot group. The above-mentioned group including 40 frames is hereinafter referred to as an ODTU24 (Optical channel Data Tributary Unit 2 into 4). The accommodating portion 15 treats the ODTU24 frame as a unit, and accommodates a single ODTU24 frame in 80 ODU4 frames. That is, the accommodating portion 15 treats the ODTU24 frame as 80-multi frames. The accommodating portion 15 treats two multi frames including the odd number ODU4 frame and the even number ODU4 frame as a single sub-multi frame. Therefore, the accommodating portion 15 is capable of accommodating a single ODTU24 frame into 40 sub-multi-frames.

The inserting portion 14 adds frequency adjustment byte (JOH1 and JOH2 in FIG. 22) of 2 bytes×4 rows into the ODTU24 frame having multi frame numbers of #A to #H. The inserting portion 14 inserts a fixed stuff byte so that a bit rate of the ODTU24 corresponding to that of 8 tributary slots is obtained. In the embodiment, the inserting portion 14 inserts two of the second fixed stuff byte (13 bytes×4 rows), and inserts the third fixed stuff byte of 2 bytes×4 rows in the ODTU24 frame at every 10 multi frames or at every 5 multi frames. The accommodating portion 15 accommodates the ODTU24 frame in the above-mentioned tributary slot groups #A to #H.

The inserting portion 14 inserts the JOH having 2 bytes×4 rows of the ODTU24 frame corresponding to the multi frame numbers into the 16th column and 17th column of the ODU4 frame, if the multi frame number of the ODU4 frame is #A to #H. With the processes, the ODU4 accommodates the ODU2 signal.

Figure 23:
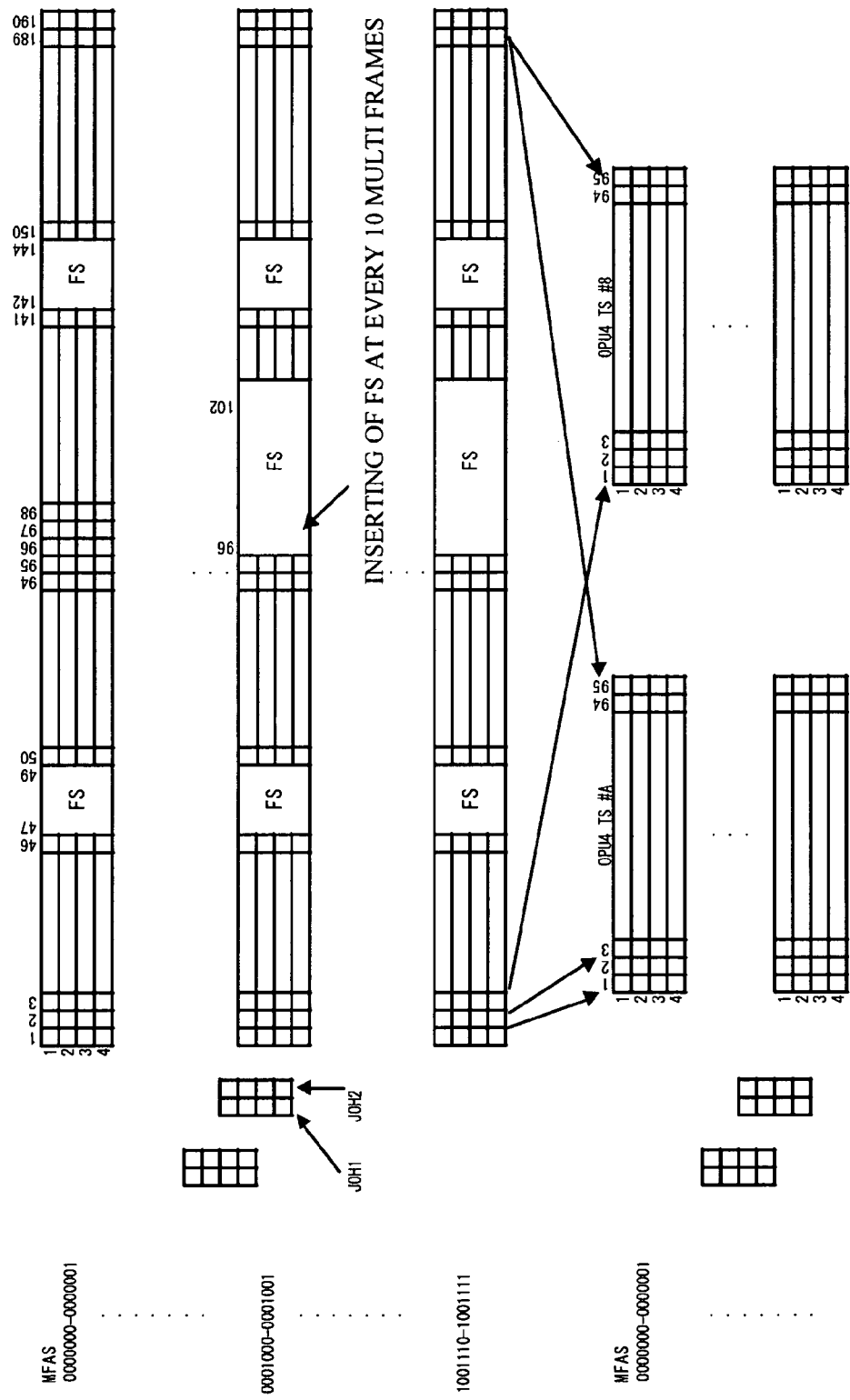
FIG. 23 illustrates a case where ODU4 accommodates ODU1 signal as a client signal.

FIG. 23 illustrates a case where the ODU4 accommodates the ODU1 signal as a client signal. In concrete, FIG. 23 illustrates a case where the ODU4 accommodates the ODU1 signal with tributary slot groups #A and #B. "#A" and "#B" are an integer of 1 to 80, and has a relation of A<B.

The accommodating portion 15 accommodates the ODU1 signal in a frame having a frame size of 190 bytes×4 rows before accommodating the ODU1 signal in the tributary slot group. The above-mentioned group including 40 frames is hereinafter referred to as an ODTU14 (Optical channel Data Tributary Unit 1 into 4). The accommodating portion 15 treats the ODTU14 frame as a unit, and accommodates a single ODTU14 frame into 80 ODU4 frames. That is, the accommodating portion 15 treats the ODTU14 frame as 80-multi frames. The accommodating portion 15 treats two multi frames including the odd number ODU4 frame and the even number ODU4 frame as a single sub-multi frame. Therefore, the accommodating portion 15 is capable of accommodating a single ODTU14 frame in 40 sub-multi-frames.

The inserting portion 14 adds frequency adjustment byte (JOH1 and JOH2 in FIG. 23) of 2 bytes×4 rows into the ODTU14 frame having multi frame number of #A and #B. The inserting portion 14 inserts a fixed stuff byte so that a bit rate of the ODTU14 corresponding to two tributary slots is obtained. In the embodiment, the inserting portion 14 inserts two of the second fixed stuff byte of 3 bytes×4 rows, and inserts the third fixed stuff byte of 7 bytes×4 rows in the ODTU 14 frame at every 10 multi frames or at every 5 multi frame. The accommodating portion 15 accommodates the ODTU14 frame in the above-mentioned tributary slot groups #A and #B.

The inserting portion 14 inserts the JOH having 2 bytes×4 rows of the ODTU14 frame corresponding to the multi frame numbers into the 16th column and 17th column of the ODU4 frame, if the multi frame number of the ODU4 frame is #A and #B. With the processes, the ODU4 accommodates the ODU1 signal.

Figure 24:
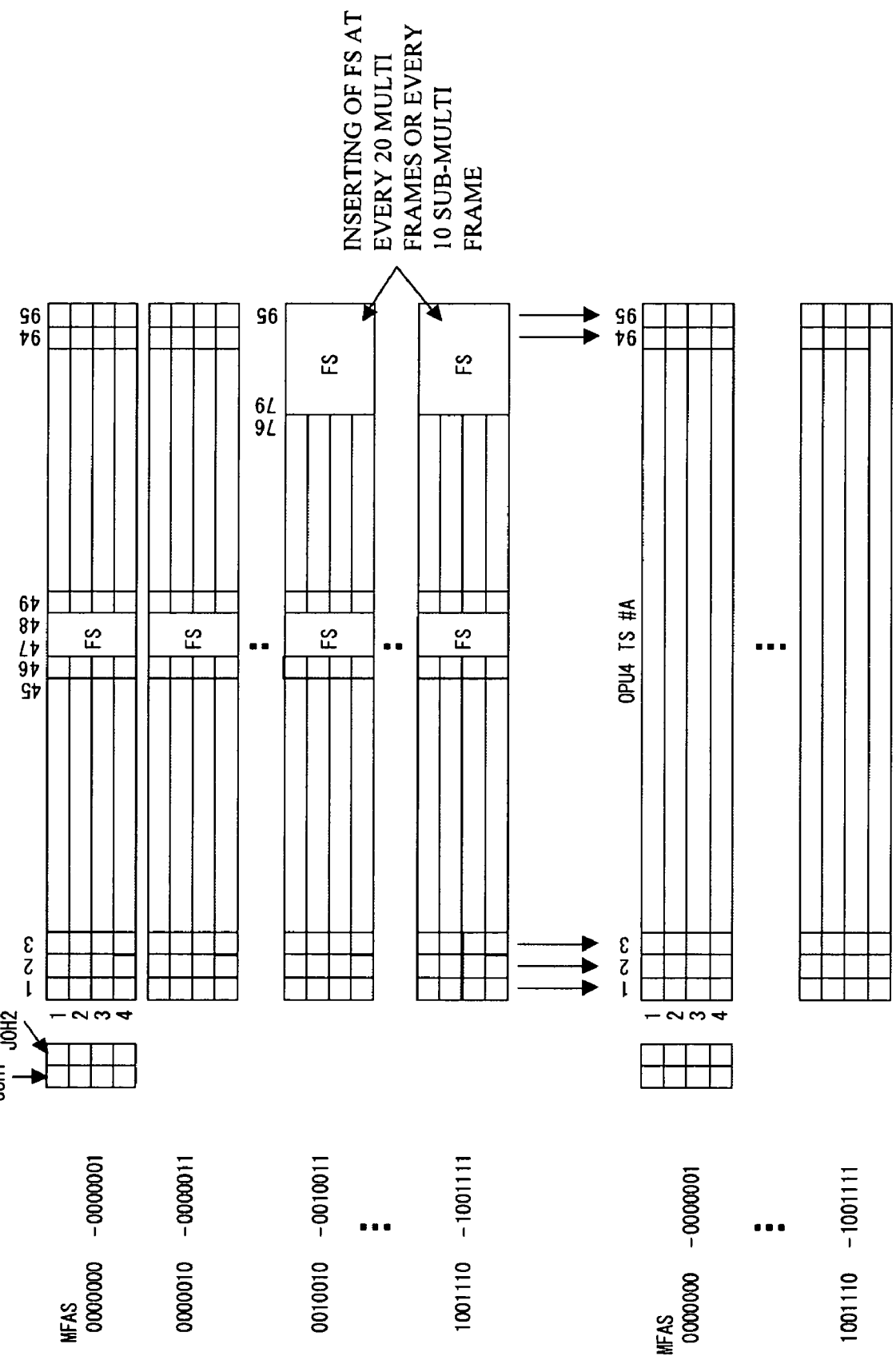
FIG. 24 illustrates a case where ODU4 accommodates ODU0 signal as a client signal.

FIG. 24 illustrates a case where the ODU4 accommodates the ODU0 signal as a client signal. In concrete, FIG. 24 illustrates a case where the ODU4 accommodates the ODU0 signal with a single tributary slot group #A. "#A" is an integer of 1 to 80.

The accommodating portion 15 accommodates the ODU1 signal in a frame having a frame size of 95 bytes×4 rows before accommodating the ODU0 signal in the tributary slot group. The above-mentioned group including 40 frames is hereinafter referred to as an ODTU04 (Optical channel Data Tributary Unit 0 into 4). The accommodating portion 15 treats the ODTU04 frame as a unit, and accommodates a single ODTU04 frame in 80 ODU4 frames. That is, the accommodating portion 15 treats the ODTU04 frame as 40-multi frames. The accommodating portion 15 accommodates a single ODTU04 frame into 80 ODU4 frames. The accommodating portion 15 treats two multi frames including the odd number ODU4 frame and the even number ODU4 frame as a single sub-multi frame. Therefore, the accommodating portion 15 is capable of accommodating a single ODTU04 frame in 40 sub-multi-frames.

The inserting portion 14 adds frequency adjustment byte (JOH1 and JOH2 in FIG. 24) of 2 bytes×4 rows into the ODTU04 frame having multi frame number of #A. The inserting portion 14 inserts a fixed stuff byte so that a bit rate of the ODTU04 corresponding to a single tributary slot is obtained. In the embodiment, the inserting portion 14 inserts the second fixed stuff byte of 2 bytes×4 rows into the ODTU04 frame, and inserts the third fixed stuff byte of 17 bytes×4 rows into the ODTU04 frame at every 20 multi frame or at every 10 multi frame. The accommodating portion 15 accommodates the ODTU04 frame in the above-mentioned tributary slot group #A.

The inserting portion 14 inserts the JOH having 2 bytes×4 rows of the ODTU04 frame corresponding to the multi frame numbers into the 16th column and 17th column of the ODU4 frame, if the multi frame number of the ODU4 frame is #A. With the processes, the ODU4 accommodates the ODU0 signal.

Figure 25:
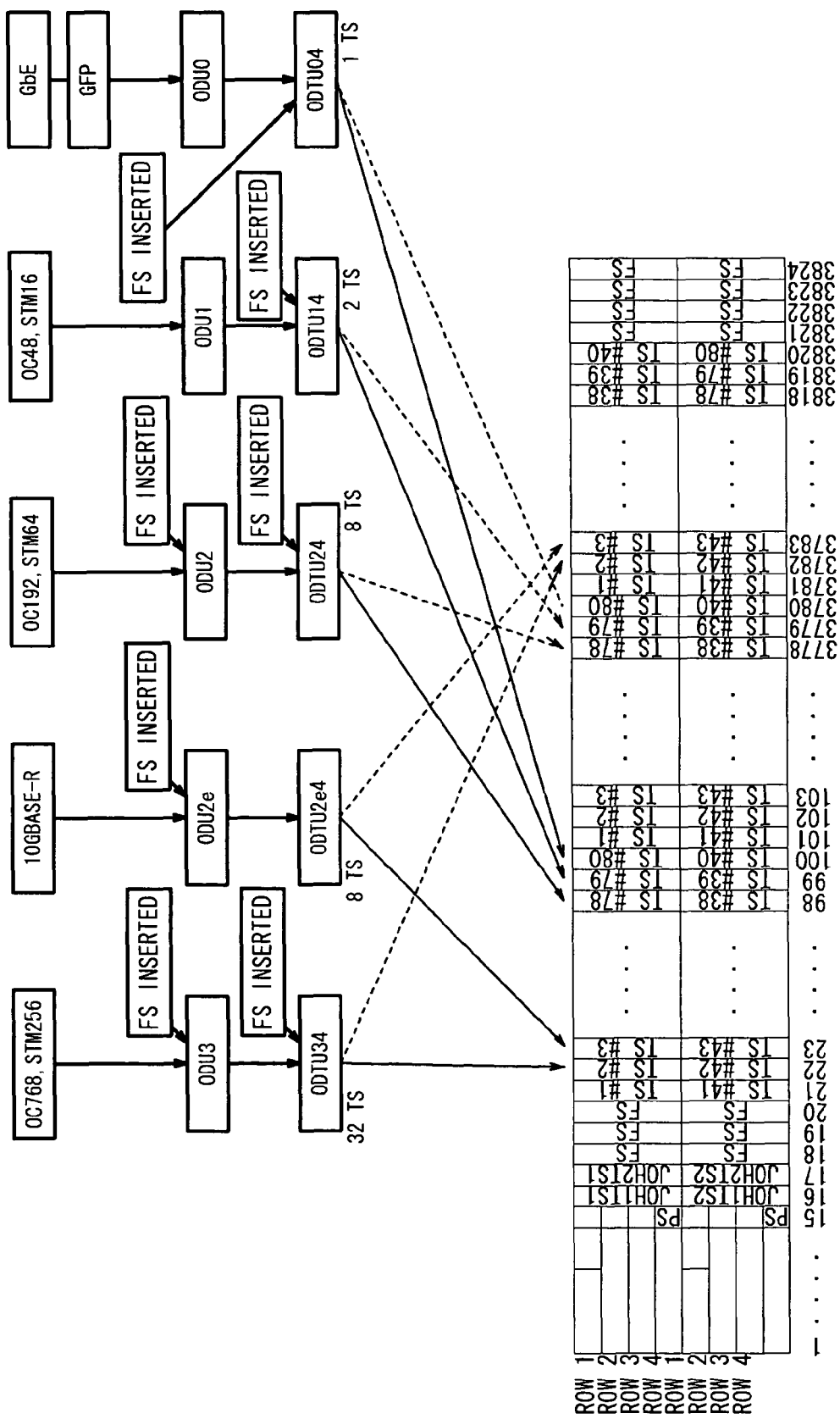
FIG. 25 illustrates a multiplexing method of 80-multi frames processing.

FIG. 25 and FIG. 26 illustrate a multiplexing method of the above-mentioned 80-multi frames processing. FIG. 25 and FIG. 26 illustrate "with" or "without" inserting of the fixed stuff byte other than the first fixed stuff byte, necessary tributary slot group number, multiplexing number to the ODU4, and so on.

Figure 27:
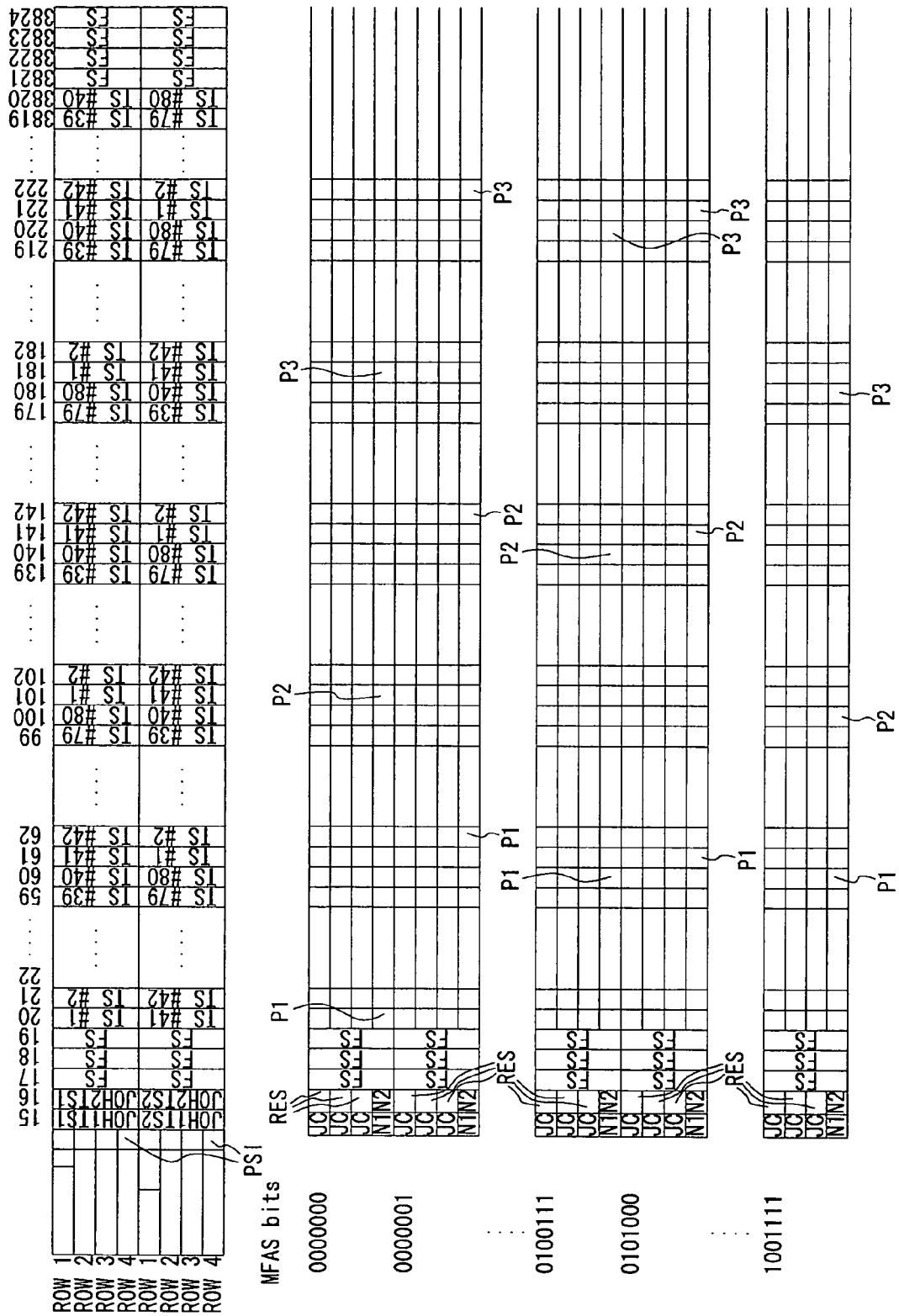
FIG. 27 illustrates an overhead for frequency deviation adjustment of ODU4 frame accommodating multiplexed ODUk signals.

FIG. 27 illustrates an overhead for frequency deviation adjustment of the ODU4 frame accommodating multiplexed ODUk signals. The inserting portion 14 inserts the JOH of a tributary slot group #i+1 into the 16th column and 17th column of the ODU4 frame of a multi frame #i. The inserting portion 14 inserts a first positive stuff byte (P1 in FIG. 27) of the tributary slot group #i+1 into the fourth row of the 20+(i+1) th column, inserts a second positive stuff byte (P2 in FIG. 27) of the tributary slot group #i+1 into the fourth row of the 100+(i+1) th column, and inserts a third positive stuff byte (P3 in FIG. 27) of the tributary slot group #i+1 into the fourth row of the 180+(i+1) th column.

The inserting portion 14 inserts a first negative stuff byte (N1 in FIG. 27) and a second negative stuff byte (N2 in FIG. 27) into the fourth row of the JOH of the 16th column and the 17th column respectively. The inserting portion 14 inserts a JC overhead for stuff amount control into the first row to the third row of the 16th column.

FIG. 28 illustrates a control condition of the JC byte, each NJO {1, 2} and PJO {1, 2, 3}. It is controlled whether the NJO byte and the PJO byte store the client data (Data byte) or the Justification byte for the frequency deviation adjustment, with lower 3 bit of the JC byte (the 6th bit to the 8th bit).

FIG. 29 illustrates JC amount that is required when the ODU4 accommodates each client signal. The JC amount is (max) in FIG. 29 having opposite sign. Therefore, 2 bytes of NJO is required if (max) is +1.8087.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A frame generating method comprising:
   inserting a first fixed stuff byte and a second fixed stuff byte into a payload area of an OTU (Optical Channel Transport Unit) frame, the first fixed stuff byte being of (8+10n ("n" is zero or a given positive integer)) ×4 rows, the second fixed stuff byte being of a given byte ×4 rows, the given byte being equal to zero or more and being equal to (24−10n) or more; and
   accommodating 100 Gbps Ethernet signal or multiplexing and accommodating at least one of ODU (Optical channel Data Unit) 3, ODU2, ODU2e and ODU1 client signals in the payload area other than the first fixed stuff byte and the second fixed stuff byte.

2. The frame generating method as claimed in claim 1, wherein one byte ×4 rows of the first fixed stuff byte are inserted into 17th column of the OTU frame in the inserting.

3. The frame generating method as claimed in claim 1, wherein "n" is set to be zero in the inserting.

4. The frame generating method as claimed in claim 3, wherein 4 bytes ×4 rows of the first fixed stuff byte are inserted into 17th column to 20th column of the OTU frame and the rest of the first fixed stuff byte are inserted into 3821th column to 3824th column of the OTU frame in the inserting.

5. The frame generating method as claimed in claim 1, wherein the second fixed stuff byte is divided into two of 16 bytes ×4 rows in the inserting.

6. The frame generating method as claimed in claim 5, wherein the second fixed stuff byte is inserted into 1265th column to 1280th column and 2545th column to 2560th column of the OTU frame in the inserting.

7. The frame generating method as claimed in claim 1, wherein the Ethernet signal accommodated in the payload area is 100 Gb Ethernet signal or a given signal having the same bit rate as the 100 Gb Ethernet signal instead of the Ethernet signal.

8. The frame generating method as claimed in claim 1, further comprising storing a negative stuff byte data for absorbing frequency deviation in the first fixed stuff byte and storing a positive stuff byte data for absorbing frequency deviation in an area other than a fixed stuff byte of OPU (Optical Channel Payload Unit) payload area of the OTU frame, in addition to another negative stuff byte secured to absorb frequency deviation in an overhead area of the OTU frame, when a client signal having a frequency deviation is accommodated in the OTU frame.

9. The frame generating method as claimed in claim 8, wherein a stuff processing control byte for controlling data storing of the positive and negative stuff byte are allocated to unused bit of frequency adjustment byte defined in an overhead area of the OTU frame in the storing.

10. A frame generating method comprising:
    inserting a first fixed stuff byte into a payload area of an OPU (Optical Channel Payload Unit) frame of each of 40 OTU (Optical Channel Transport Unit) frames, the first fixed stuff byte being of (8+40n ("n" is zero or a given positive integer)) ×4 rows; and
    accommodating (95−n) tributary slot groups including 40 tributary slots in a payload area other than the first fixed stuff byte of each of the 40 OPU frames and treating the 40 OTU frames as a single multi frame period when accommodating a plurality of signal types in the OTU frame, a unit of the tributary slot being 1 byte ×4 rows,
    wherein 100 Gbps Ethernet signal is accommodated or at least one of ODU (Optical channel Data Unit) 3, ODU2, ODU2e and ODU1 client signals is multiplexed and accommodated in the tributary slots in the accommodating.

11. The frame generating method as claimed in claim 10, wherein an ODU3 (Optical Channel Data Unit 3) client signal is accommodated in tributary slot groups of given 16 of the 40 OPU frames in the accommodating.

12. The frame generating method as claimed in claim 10, wherein an ODU2e client signal is accommodated in tributary slot groups of given 4 of the 40 OPU frames in the accommodating.

13. The frame generating method as claimed in claim 10, wherein an ODU2 client signal is accommodated in tributary slot groups of given 4 of the 40 OPU frames in the accommodating.

14. The frame generating method as claimed in claim 10, wherein an ODU1 client signal is accommodated in tributary a slot group of given one of the 40 OPU frames in the accommodating.

15. A frame generating method comprising:
    inserting a first fixed stuff byte into a payload area of an OPU (Optical Channel Payload Unit) frame of each of 80 OTU (Optical Channel Transport Unit) frames, the first fixed stuff byte being of (8+80n ("n" is zero or a given positive integer)) ×4 rows; and
    accommodating (95−n) tributary slot groups including 80 tributary slots in a payload area other than the first fixed stuff byte and treating the 80 OTU frames as a single multi frame period when accommodating a plurality of signal types in the OTU frame, a unit of the tributary slot being 1 byte ×4 rows, each two of the 80 OPU frames being treated as a single group,
    wherein 100 Gbps Ethernet signal is accommodated or at least one of ODU (Optical channel Data Unit) 3, ODU2, ODU2e, ODU1 and ODU0 client signals is multiplexed and accommodated in the tributary slots.

* * * * *

UNITED STATES PATENT AND TRADEMARK OFFICE
CERTIFICATE OF CORRECTION

| | |
|---|---|
| PATENT NO. | : 8,249,108 B2 |
| APPLICATION NO. | : 12/461002 |
| DATED | : August 21, 2012 |
| INVENTOR(S) | : Toru Katagiri et al. |

Page 1 of 1

It is certified that error appears in the above-identified patent and that said Letters Patent is hereby corrected as shown below:

Title Page;

Please insert

-- (30) Foreign Application Priority Data

September 1, 2008   (JP) ............. 2008-224104 --

Signed and Sealed this
Twentieth Day of November, 2012

David J. Kappos
*Director of the United States Patent and Trademark Office*